(12) United States Patent
Yang et al.

(10) Patent No.: US 12,518,417 B2
(45) Date of Patent: Jan. 6, 2026

(54) METHOD AND DEVICE FOR GENERATING METADATA ESTIMATIONS BASED ON METADATA SUBDIVISIONS

(71) Applicant: Apple Inc., Cupertino, CA (US)

(72) Inventors: Xiaohua Yang, San Jose, CA (US); Jin Wook Chang, San Jose, CA (US); Xin Wang, Cupertino, CA (US); Xuemei Zhang, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 318 days.

(21) Appl. No.: 18/369,354

(22) Filed: Sep. 18, 2023

(65) Prior Publication Data

US 2024/0104766 A1    Mar. 28, 2024

Related U.S. Application Data

(60) Provisional application No. 63/409,322, filed on Sep. 23, 2022.

(51) Int. Cl.
  *G06T 7/73*     (2017.01)
  *G06F 3/01*     (2006.01)

(52) U.S. Cl.
  CPC ............. *G06T 7/73* (2017.01); *G06F 3/012* (2013.01); *G06F 3/013* (2013.01); *G06T 2207/20021* (2013.01); *G06T 2207/30196* (2013.01)

(58) Field of Classification Search
  CPC ........... G06T 7/73; G06T 3/012; G06T 3/013; G06T 2207/20021; G06T 2207/30196
  USPC ........................................................ 382/103
  See application file for complete search history.

(56) References Cited

U.S. PATENT DOCUMENTS

| | | | |
|---|---|---|---|
| 7,075,553 | B2 | 7/2006 | Miller et al. |
| 11,314,325 | B2 | 4/2022 | Young et al. |
| 2014/0092006 | A1 | 4/2014 | Boelter et al. |
| 2020/0128054 | A1* | 4/2020 | Miller .................... G06F 3/017 |
| 2021/0021908 | A1* | 1/2021 | Phillips ................ H04N 21/816 |
| 2023/0356728 | A1* | 11/2023 | Jain ......................... G06F 3/013 |

* cited by examiner

*Primary Examiner* — Gabriel I Garcia
(74) *Attorney, Agent, or Firm* — Fernando & Partners, LLP

(57) ABSTRACT

In one implementation, a method is performed for generating metadata estimations based on metadata subdivisions. The method includes: obtaining an input image; obtaining metadata associated with the input image; subdividing the metadata into a plurality of metadata subdivisions; determining a viewport relative to the input image based on at least one of head pose information and eye tracking information; generating one or more metadata estimations by performing an estimation algorithm on at least a portion of the plurality of metadata subdivisions based on the viewport; and generating an output image by performing an image processing algorithm on the input image based on the one or more metadata estimations.

23 Claims, 15 Drawing Sheets

Bilinear Interpolation Algorithm 712

Area-based Weighted Sum Algorithm 714

930

At a controller including one or more processors, non-transitory memory, and a communication interface, wherein the controller is communicatively coupled to an electronic device with a display device and an input capture device via the communication interface: — 932

Obtain an input image

↓

Obtain metadata associated with the input image — 934

↓

Subdivide the metadata into a plurality of metadata subdivisions — 936

Tessellate the metadata into a plurality of tiles — 938

↓

Generate encoded information based on the input image and the plurality of metadata subdivisions — 940

↓

Transmit the encoded information to the electronic device via the communication interface — 942

At an electronic device including one or more processors, non-transitory memory, a communication interface, a display device, and an input capture device, wherein the electronic device is communicatively coupled to a controller via the communication interface: — 952

Obtain a plurality of metadata subdivisions associated with an input image from controller via the communication interface Determine a viewport relative to the input image based on at least one of head pose information and eye tracking information — 954

Generate one or more metadata estimations by performing an estimation algorithm on at least a portion of the plurality of metadata subdivisions associated with the viewport — 956

Select the portion of the plurality of metadata subdivisions based on the viewport — 958

The portion of the plurality of metadata subdivisions corresponds to a subset of tiles from among the plurality of tiles that at least partially overlap the viewport — 958A The portion of the plurality of metadata subdivisions corresponds to a subset of tiles from among the plurality of tiles that at least partially overlap a bounding box surrounding the viewport — 958B Generate an output image by performing an image processing algorithm on the input image based on the one or more metadata estimations — 960

Present the output image via the display device — 962

Figure 9C

METHOD AND DEVICE FOR GENERATING METADATA ESTIMATIONS BASED ON METADATA SUBDIVISIONS

CROSS-REFERENCE TO RELATED APPLICATIONS

This application is claims priority to U.S. Provisional Patent App. No. 63/409,322, filed on Sep. 23, 2022, which is hereby incorporated by reference in its entirety.

TECHNICAL FIELD

The present disclosure generally relates to subdividing metadata and, in particular, to systems, devices, and methods for generating metadata estimations based on metadata subdivisions.

BACKGROUND

Per frame metadata is often available for image processing algorithms. However, processing of the per frame metadata may consume significant resources and produce a sub-par result.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 9B illustrates a flowchart representation of a method of generating on metadata subdivisions in accordance with some implementations.

FIG. 9C illustrates a flowchart representation of another method of generating metadata estimations based on metadata subdivisions in accordance with some implementations.

Figure 1:
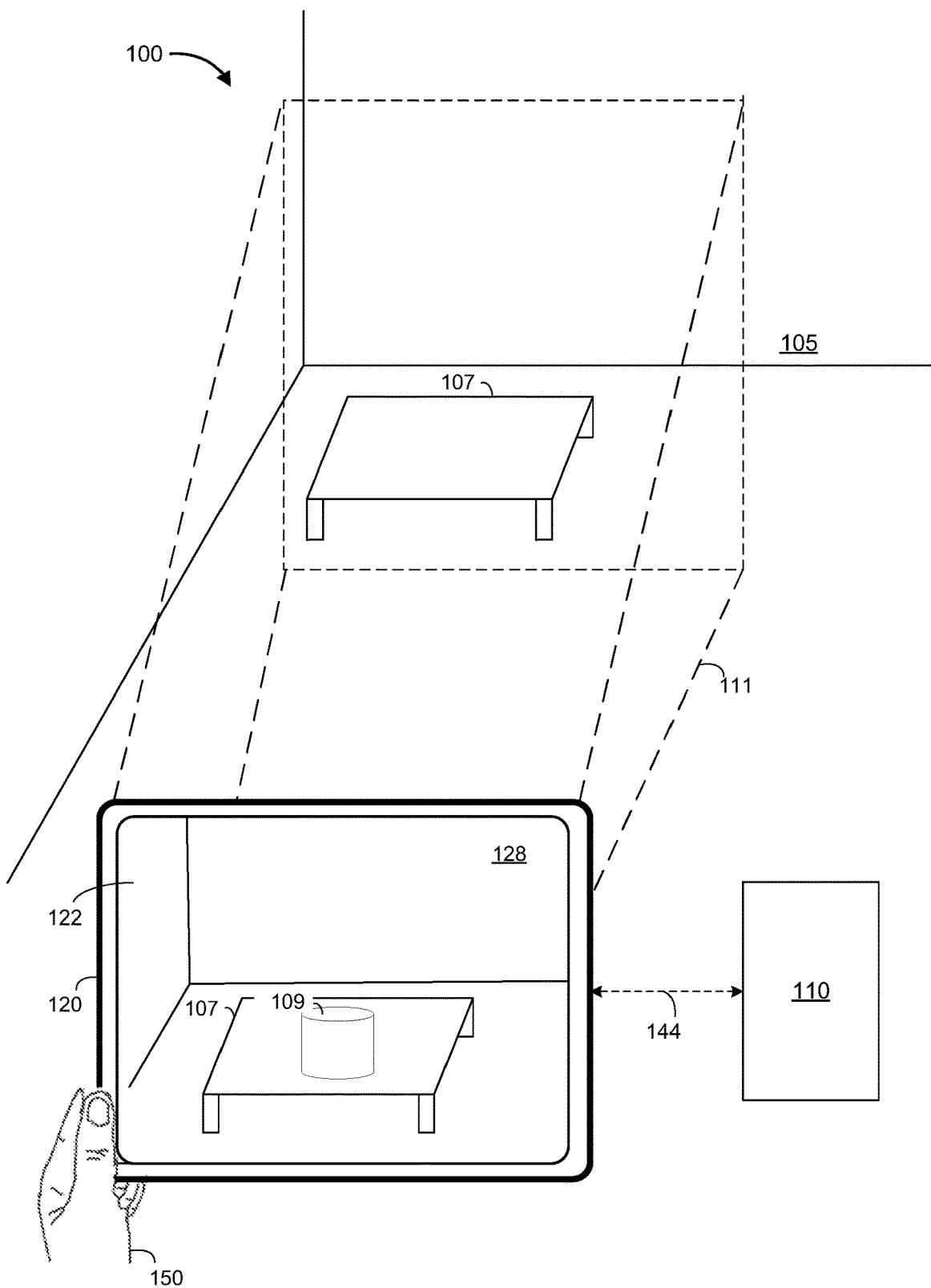
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for generating metadata estimations based on metadata subdivisions. According to some implementations, the method is performed at a computing system including non-transitory memory and one or more processors, wherein the computing system is communicatively coupled to a display device, an image capture device, and optionally one or more input devices. The method includes: obtaining an input image; obtaining metadata associated with the input image; subdividing the metadata into a plurality of metadata subdivisions; determining a viewport relative to the input image based on at least one of head pose information and eye tracking information; generating one or more metadata estimations by performing an estimation algorithm on at least a portion of the plurality of metadata subdivisions based on the viewport; and generating an output image by performing an image processing algorithm on the input image based on the one or more metadata estimations.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the displayed XR environment 128 will not include the XR cylinder 109. As another example, the XR cylinder 109 corresponds to body-locked content such that it remains at a positional and rotational offset from the body of the user 150. In some examples, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
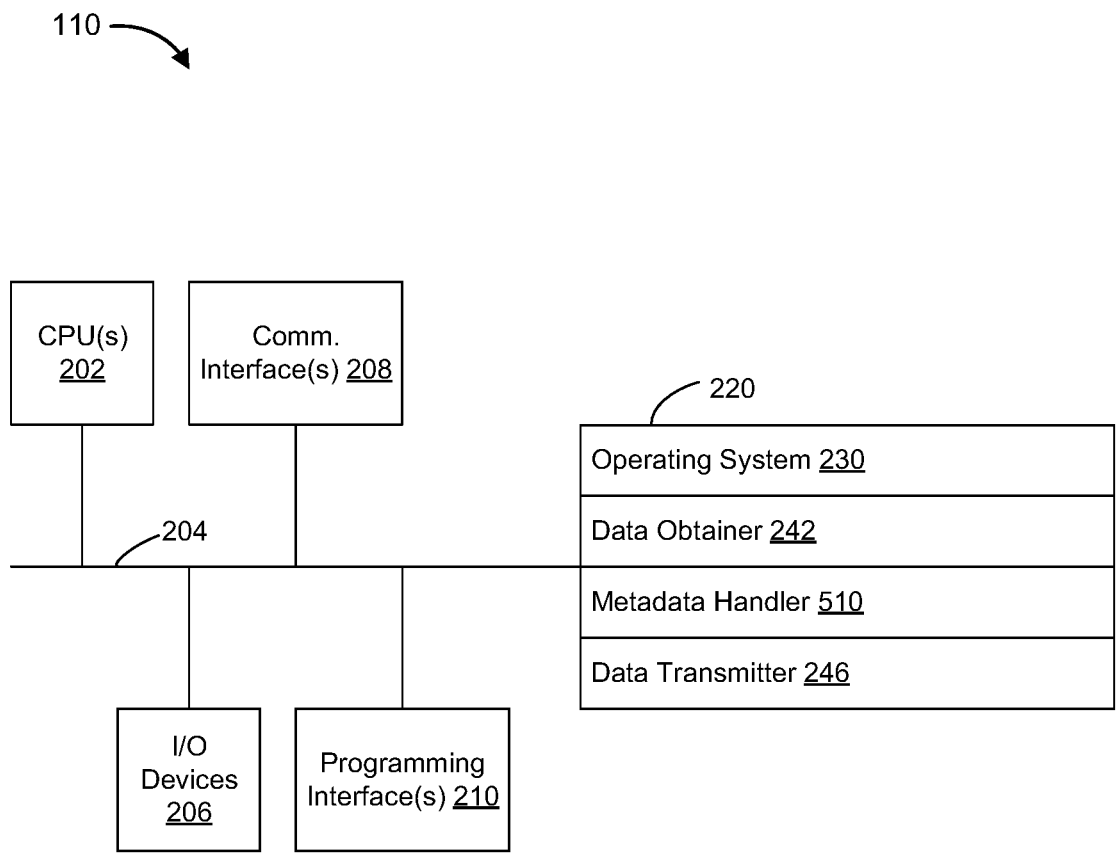
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

An operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

Figure 5:
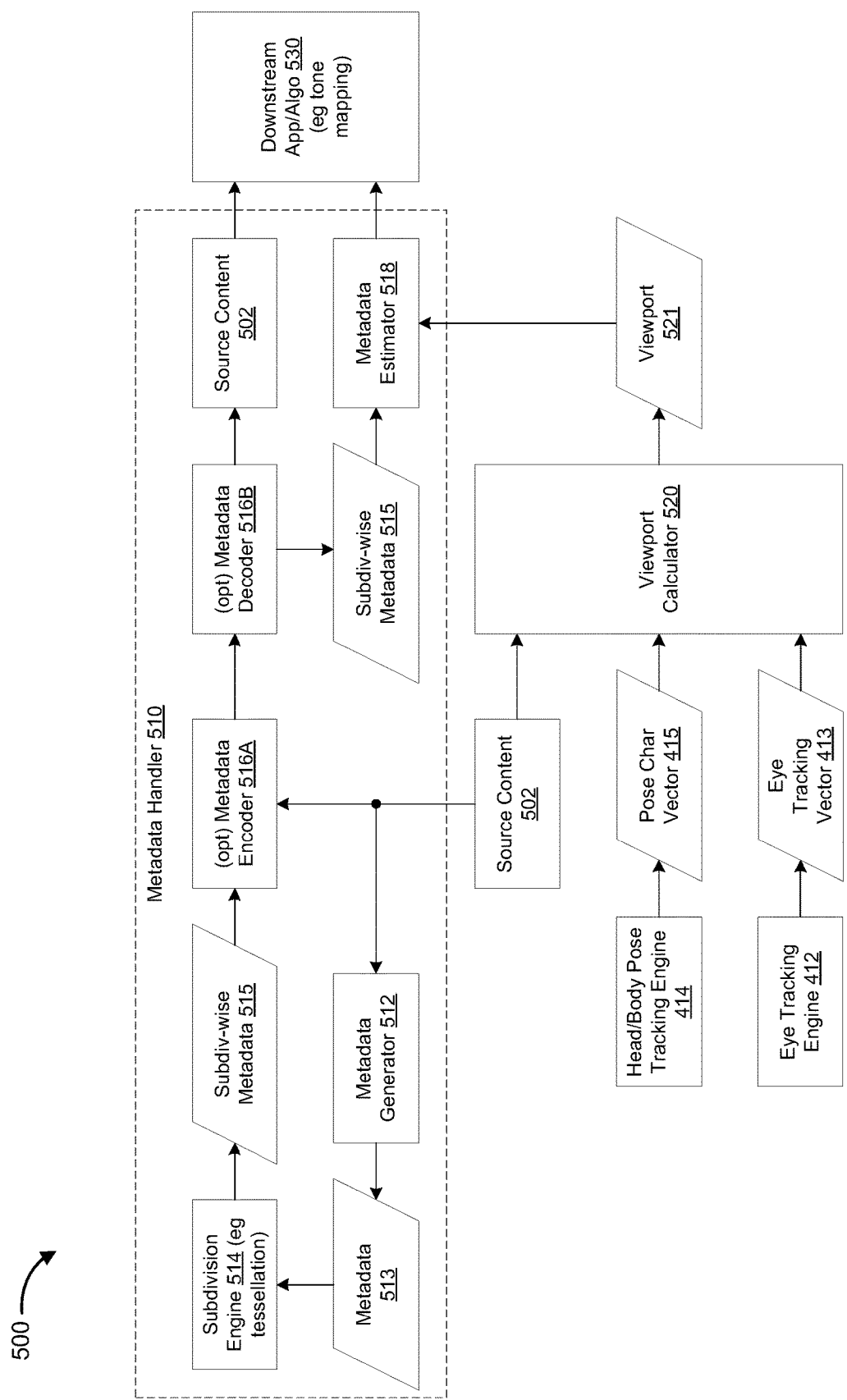
FIG. 5 is a block diagram of an example image processing architecture in accordance with some implementations.

In some implementations, the controller 110 includes at least a portion of a metadata handler 510 described below in more detail with reference to FIG. 5. According to some implementations, the metadata handler 510 is configured to generate metadata for source content (e.g., an image or an image stream), subdivide the metadata (e.g., tessellate), encode/decode the metadata into/out of the source content, and generate a metadata estimation based on a viewport. As shown in FIG. 5, the metadata handler 510 includes a metadata generator 512, a subdivision engine 514, and a metadata estimator 518. In FIG. 5, the metadata handler 510 also includes an optional metadata encoder 516A and an optional metadata decoder 516B. To that end, in various implementations, the metadata handler 510 includes instructions and/or logic therefor, and heuristics and metadata therefor.

In some implementations, a data transmitter 246 is configured to transmit data (e.g., metadata subdivisions, presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

Although the data obtainer 242, the metadata handler 510, and data transmitter 246 are shown as residing on a single device (e.g., the controller 110), it should be understood that in other implementations, any combination of the data obtainer 242, the metadata handler 510, and the data transmitter 246 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
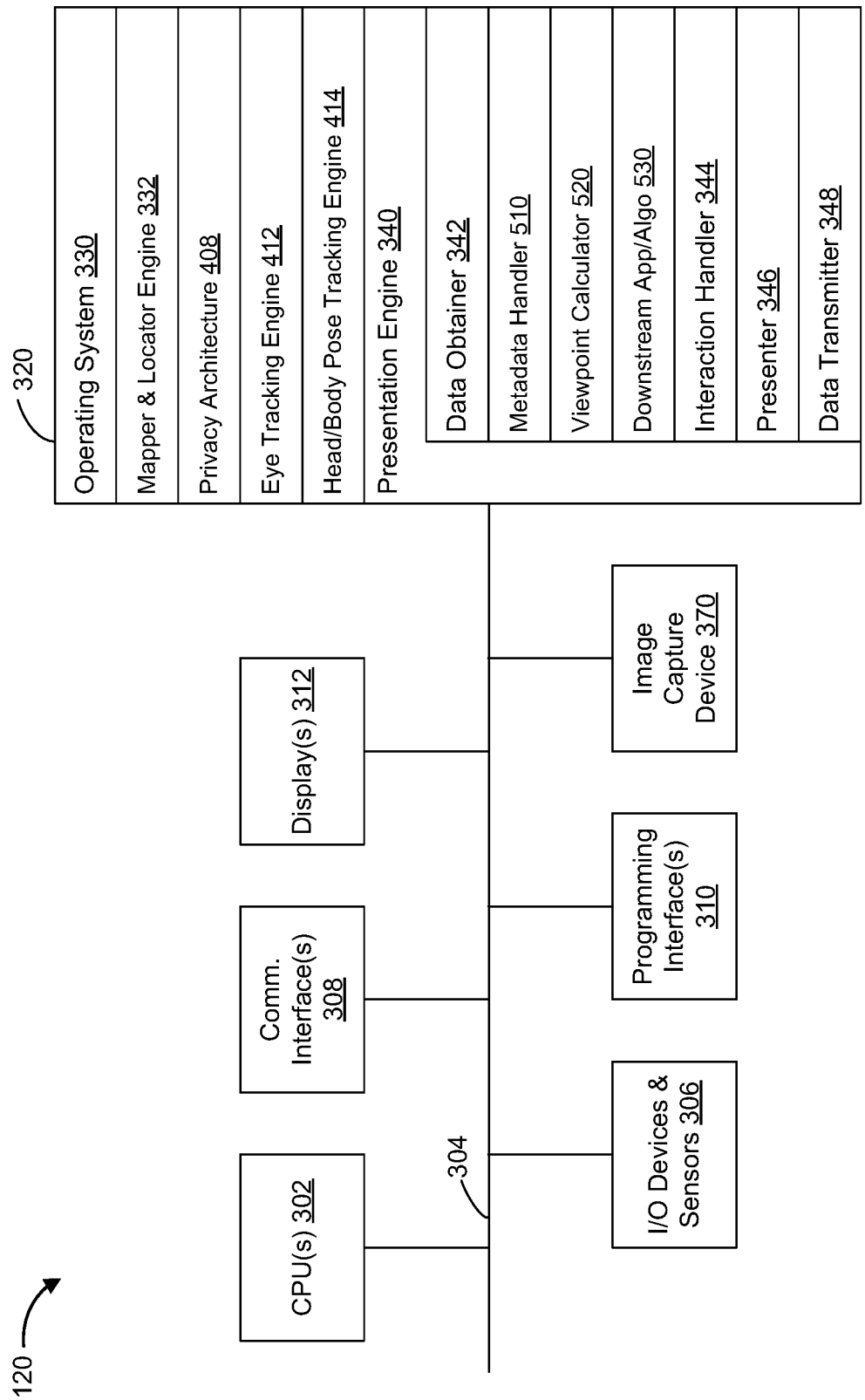
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a head/body pose tracking engine, a hand/limb/finger/extremity tracking engine, a camera pose tracking engine, an ambient light sensor, one or more environmental sensors (e.g., a thermometer, a barometer, or the like), and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks.

In some implementations, a mapper and locator engine 332 is configured to map the physical environment 105 and to track the position/location of at least the electronic device 120 or the user 150 with respect to the physical environment 105. To that end, in various implementations, the mapper and locator engine 332 includes instructions and/or logic therefor, and heuristics and metadata therefor.

In some implementations, a privacy architecture 408 is configured to ingest data and filter user information and/or identifying information within the data based on one or more privacy filters. The privacy architecture 408 is described in more detail below with reference to FIG. 4A. To that end, in various implementations, the privacy architecture 408 includes instructions and/or logic therefor, and heuristics and metadata therefor.

Figure 4:
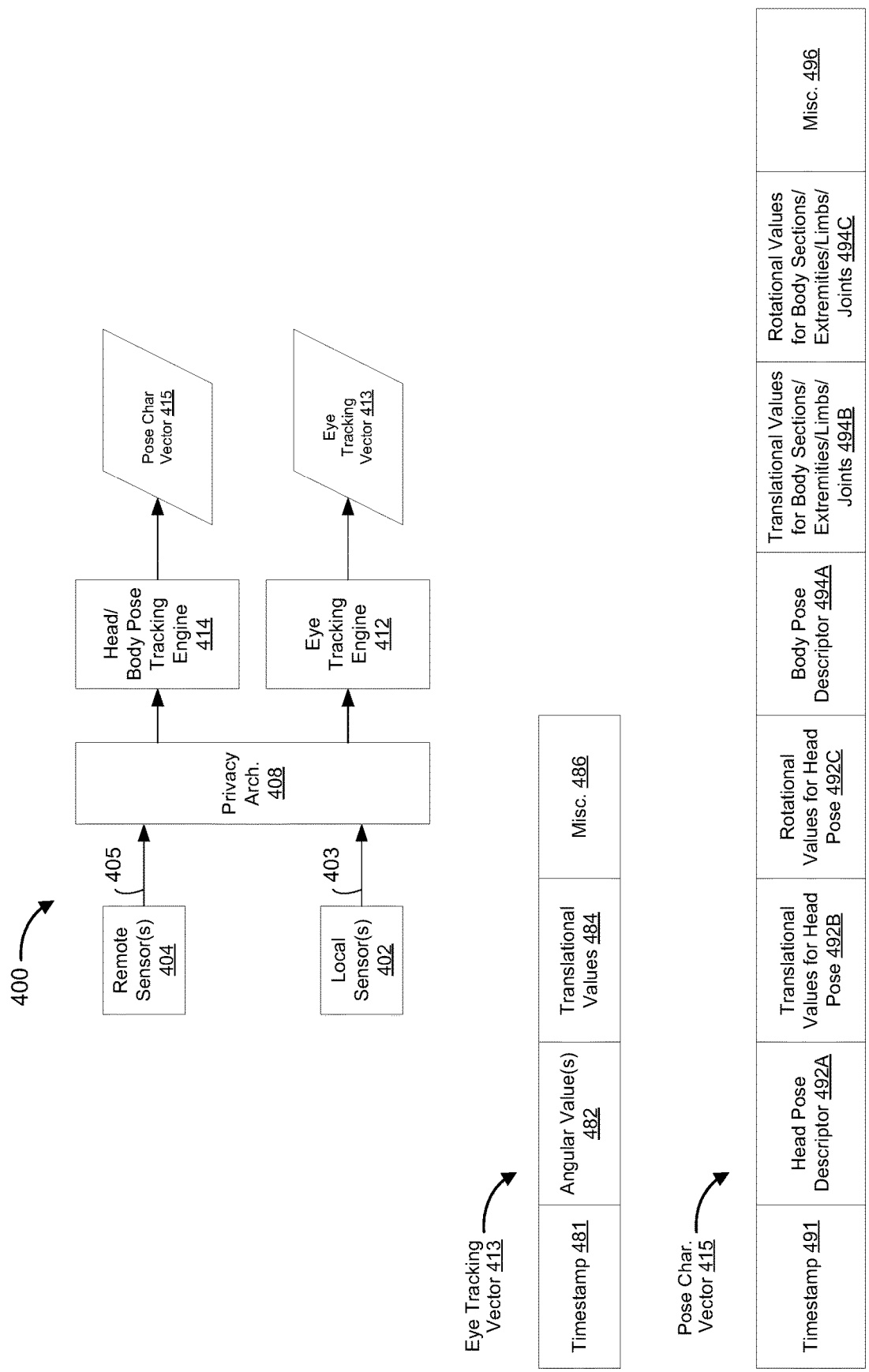
FIG. 4 is a block diagram of an example input processing architecture in accordance with some implementations.

In some implementations, an eye tracking engine 412 is configured to obtain (e.g., receive, retrieve, or determine/generate) an eye tracking vector 413 (sometimes also referred to herein as the "gaze vector 413") as shown in FIG. 4 (e.g., with a gaze direction) based on the input data and update the eye tracking vector 413 over time. For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a ROI in the XR environment 128 at which the user 150 is currently looking. The eye tracking engine 412 is described in more detail below with reference to FIG. 4. To that end, in various implementations, the eye tracking engine 412 includes instructions and/or logic therefor, and heuristics and metadata therefor.

In some implementations, a head/body pose tracking engine 414 is configured to obtain (e.g., receive, retrieve, or determine/generate) a pose characterization vector 415 based on the input data and update the pose characterization vector 415 over time. For example, as shown in FIG. 4, the pose characterization vector 415 includes a head pose descriptor 492A (e.g., upward, downward, neutral, etc.), translational values 492B for the head pose, rotational values 492C for the head pose, a body pose descriptor 494A (e.g., standing, sitting, prone, etc.), translational values 494B for body sections/extremities/limbs/joints, rotational values 494C for the body sections/extremities/limbs/joints, and/or the like. The head/body pose tracking engine 414 is described in more detail below with reference to FIG. 4. To that end, in various implementations, the head/body pose tracking engine 414 includes instructions and/or logic therefor, and heuristics and metadata therefor. In some implementations, the eye tracking engine 412, and the head/body pose tracking engine 414 may be located on the electronic device 120 in addition to or in place of the controller 110. In some implementations, the eye tracking engine 412 and the head/body pose tracking engine 414 may be located on the controller 110 in addition to or in place of the electronic device 120.

In some implementations, the presentation engine 340 is configured to present media content and/or XR content via the one or more displays 312. To that end, in various implementations, the presentation engine 340 includes a data obtainer 342, a metadata handler 510, a viewport calculator 520, a downstream application/algorithm 530, an interaction handler 344, a presenter 346, and a data transmitter 348.

In some implementations, the data obtainer 342 is configured to obtain data (e.g., metadata subdivisions, presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the electronic device includes at least a portion of a metadata handler 510 described below in more detail with reference to FIG. 5. According to some implementations, the metadata handler 510 is configured to generate metadata for source content (e.g., an image or an image stream), subdivide the metadata (e.g., tessellate), encode/decode the metadata into/out of the source content, and generate a metadata estimation based on a viewport. As shown in FIG. 5, the metadata handler 510 includes a metadata generator 512, a subdivision engine 514, and a metadata estimator 518. In FIG. 5, the metadata handler 510 also includes an optional metadata encoder 516A and an optional metadata decoder 516B. To that end, in various implementations, the metadata handler 510 includes instructions and/or logic therefor, and heuristics and metadata therefor.

In some implementations, a viewport calculator 520 is configured to determine a viewport of the user (e.g., a field-of-view (FOV), viewing frustum, or the like) based on the eye tracking vector 413 and/or the pose characterization vector 415. The viewport calculator 520 is described below in more detail with reference to FIGS. 5 and 7A. To that end, in various implementations, the viewport calculator 520 includes instructions and/or logic therefor, and heuristics and metadata therefor.

In some implementations, a downstream application/algorithm 530 is configured to process the source content (e.g., an image or an image stream) based at least in part on the metadata estimation from the metadata handler 510. For example, the downstream application/algorithm 530 corresponds to a tone mapping algorithm, a night mode function, a true tone algorithm, a high dynamic range (HDR) algorithm, and/or the like. The downstream application/algorithm 530 is described below in more detail with reference to FIG. 5. To that end, in various implementations, the downstream application/algorithm 530 includes instructions and/or logic therefor, and heuristics and metadata therefor.

In some implementations, the interaction handler 344 is configured to detect user inputs/interactions with the presented A/V content and/or XR content (e.g., touch inputs directed to a touch-sensitive surface, gestural inputs detected via hand/extremity tracking, eye gaze inputs detected via eye tracking, voice commands, etc.). To that end, in various implementations, the interaction handler 344 includes instructions and/or logic therefor, and heuristics and metadata therefor.

In some implementations, the presenter 346 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 346 includes instructions and/or logic therefor, and heuristics and metadata therefor.

In some implementations, the data transmitter 348 is configured to transmit data (e.g., presentation data, location data, user interaction data, sensor data, image data, head tracking information, camera pose tracking information, eye tracking information, hand/limb/finger/extremity tracking information, etc.) to at least the controller 110. To that end, in various implementations, the data transmitter 348 includes instructions and/or logic therefor, and heuristics and metadata therefor.

Although the mapper and locator engine 332, the privacy architecture 408, the eye tracking engine 412, the head/body pose tracking engine 414, and the presentation engine 340 are shown as residing on a single device (e.g., the electronic device 120), it should be understood that in other implementations, any combination of the mapper and locator engine 332, the privacy architecture 408, the eye tracking engine 412, the head/body pose tracking engine 414, and the presentation engine 340 may be located in separate computing devices.

In some implementations, the functions and/or components of the electronic device 120 are combined with or provided by the controller 110 shown above in FIG. 2. Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 is a block diagram of an example input processing architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the input processing architecture 400 is included in a computing system such as the controller 110 shown in FIGS. 1 and 2; the electronic device 120 shown in FIGS. 1 and 3; and/or a suitable combination thereof.

As shown in FIG. 4, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits the input processing architecture 400 or portions thereof from obtaining and/or transmitting the user information. To this end, the privacy architecture 408 receives user preferences and/or selections from the user 150 in response to prompting the user 150 for the same. In some implementations, the privacy architecture 408 prevents the input processing architecture 400 from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the eye tracking engine 412 obtains the local sensor data 403 and the remote sensor data 405 after it has been subjected to the privacy architecture 408. In some implementations, the eye tracking engine 412 obtains (e.g., receives, retrieves, or determines/generates) an eye tracking vector 413 (sometimes also referred to herein as the "gaze vector 413") based on the input data and updates the eye tracking vector 413 over time.

FIG. 4 shows an example data structure for the eye tracking vector 413 in accordance with some implementations. As shown in FIG. 4, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., roll, pitch, and yaw values), one or more translational values 484 for the current gaze direction (e.g., x, y, and z values relative to the physical environment 105, the world-at-large, and/or the like), and/or miscellaneous information 486. One of ordinary skill in the art will appreciate that the data structure for the eye tracking vector 413 in FIG. 4 is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the head/body pose tracking engine 414 obtains the local sensor data 403 and the remote sensor data 405 after it has been subjected to the privacy architecture 408. In some implementations, the head/body pose tracking engine 414 obtains (e.g., receives, retrieves, or determines/generates) a pose characterization vector 415 based on the input data and updates the pose characterization vector 415 over time.

FIG. 4 shows an example data structure for the pose characterization vector 415 in accordance with some implementations. As shown in FIG. 4, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4 is merely an example that may include different information portions in various other implementations and be structured in myriad ways in various other implementations.

FIG. 5 is a block diagram of an example image processing architecture 500 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, a computing system with one or more processors and non-transitory memory performs the processes and/or functions or the image processing architecture 500. In some implementations, the computing system corresponds to the electronic device 120 shown in FIGS. 1 and 3; the controller 110 in FIGS. 1 and 2; or a suitable combination thereof. As one example, the controller 110 includes a metadata generator 512, a subdivision engine 514, and a metadata encoder 516A. Continuing with this example, the electronic device 120 includes a metadata decoder 516B, a metadata estimator 518, a viewport calculator 520, and a downstream application/algorithm 530.

As shown in FIG. 5, the image processing architecture 500 obtains (e.g., receives, retrieves, captures, etc.) source content 502 from a local source and/or a remote source. For example, the source content 502 corresponds to an image frame or an image stream. As another example, the source content 502 corresponds to one or more keyframes.

With further reference to FIG. 5, the viewport calculator 520 determines a viewport 521 of the user relative to the source content 502 based at least in part on the eye tracking vector 413 and/or the pose characterization vector 415 described above with reference to FIG. 4. In some implementations, the viewport 521 corresponds to a current FOV of the user relative to the source content 502. In some implementations, the viewport 521 corresponds to a viewing frustum of the user relative to the source content 502.

According to some implementations, the image processing architecture 500 includes a metadata handler 510 that includes a metadata generator 512, a subdivision engine 514, an optional metadata encoder 516A, an optional metadata decoder 516B, and a metadata estimator 518. In FIG. 5, the metadata generator 512 generates metadata 513 for the source content 502 on a frame-wise basis and/or a pixel-wise basis. For example, the frame-wise metadata includes a minimum light level, a maximum light level, an average light level, a light level variance, color information, contrast information, texture information, saturation information, and/or the like for the image frame. For example, the pixel-wise metadata includes a light level, color values, color information, contrast information, texture information, saturation information, and/or the like for each pixel of the image frame. According to some implementations, the types and structure of the metadata generated by the metadata generator 512 is dependent on user preferences, user history, user context (e.g., current body pose, head pose, motion state, etc.), environment context (e.g., ambient lighting conditions, background texture/frequency, and/or the like associated with the physical environment 105), one or more labels for objects recognized within the physical environment 105, the current foreground application, the inputs/outputs of the downstream application/algorithm 530, and/or the like.

As shown in FIG. 5, the subdivision engine 514 subdivides the metadata 513 into deterministic or non-deterministic subdivisions such as a plurality of N×M pixel regions. As one example, the subdivision engine 514 tessellates the metadata 513 into a plurality of tiles. In some implementations, the subdivision engine 514 also generates subdivision-wise (e.g., tile-wise) metadata 515 based on the pixel-wise and/or frame-wise metadata.

For example, the subdivision engine 514 generates tile-wise metadata for a subject tile by averaging the pixel-wise metadata associated with the subject tile. As another example, the subdivision engine 514 generates tile-wise metadata for a subject tile by averaging the pixel-wise metadata associated with the subject tile and its neighboring tiles. As yet another example, the subdivision engine 514 generates tile-wise metadata for a subject tile by averaging the pixel-wise metadata associated with the subject tile and its neighboring tiles, where the pixel-wise metadata for the subject tile is assigned a first weight and the pixel-wise metadata for the neighboring tiles is assigned a second weight less than the first weight. One of ordinary skill in the art will appreciate that the subdivisions (e.g., the plurality of tiles) and subdivision specific metadata (e.g., the tile-wise metadata) may be generated and/or structured in myriad ways.

In FIG. 5, the optional metadata encoder 516A encodes the subdivision-wise metadata 515 into the source content 502 to generate an output encoded image stream. In some implementations, the output encoded image stream is transmitted across a channel to the optional metadata decoder 516B. In some implementations, the output encoded image stream is provided to the optional metadata decoder 516B. In FIG. 5, the optional metadata decoder 516B decodes the output encoded image stream to recover the subdivision-wise metadata 515 and the source content 502. According to some implementations, the optional metadata encoder 516A and the optional metadata decoder 516B may perform one or more error correction code (ECC) processes to reduce transmission errors and improve signal-to-noise ratio (SNR).

With further reference to FIG. 5, the metadata estimator 518 generates a metadata estimation by performing an estimation algorithm (e.g., predictive or retrospective) on the subdivision-wise metadata 515 based on the viewport 521. For example, the estimation algorithm corresponds to one of a bilinear interpolation algorithm 712 described below with reference to FIG. 8B, an area-based weighted sum algorithm 714 described below with reference to FIG. 8C, or the like. One of ordinary skill in the art will appreciate that the metadata estimator 518 may employ various spatiotemporal estimation algorithms or techniques.

As shown in FIG. 5, the downstream application/algorithm 530 performs an application, algorithm, function, process, etc. on the source content 502 based on the metadata estimation from the metadata estimator 518. For example, the downstream application/algorithm 530 corresponds to a tone mapping algorithm, a night mode function, a true tone algorithm, a high dynamic range (HDR) algorithm, and/or the like.

Figure 6A:
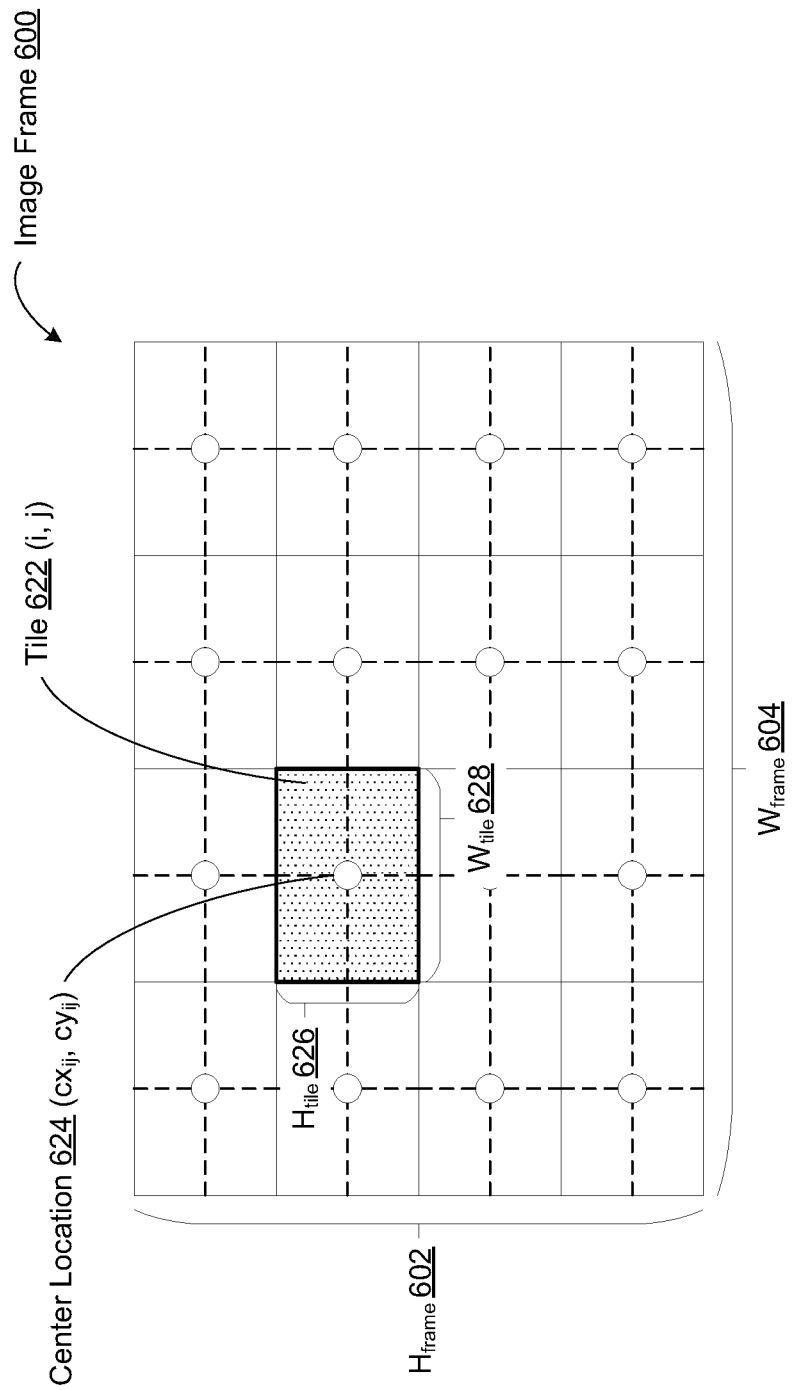
FIG. 6A illustrates an example tessellated image frame in accordance with some implementations.

FIG. 6A illustrates an example image frame 600 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 6A includes an image frame 600 with a height value $H_{frame}$ 602 and a width value $W_{frame}$ 604.

With continued reference to FIG. 6A, the computing system or a component thereof (e.g., the subdivision engine 514 in FIG. 5) tessellates the image frame 600 into a 4×4 matrix of tiles. For example, each of the plurality of tiles corresponds to a deterministic or non-deterministic N×M pixel region of the image frame 600. One of ordinary skill in the art will appreciate that the 4×4 matrix of tiles illustrated in FIG. 6A is merely an example subdivision of the image frame 600, which may be subdivided in myriad ways in various other implementations.

While the image frame 600 includes a plurality of tiles in FIG. 6A, only subject tile 622 with coordinates (i, j) is discussed herein for the sake of brevity. In FIG. 6A, the subject tile 622 includes a center location 624 with coordinates ($cx_{ij}$, $cy_{ij}$). Furthermore, the subject tile 622 has a height value $H_{tile}$ 626 and a width value $W_{tile}$ 628.

Figure 6B:
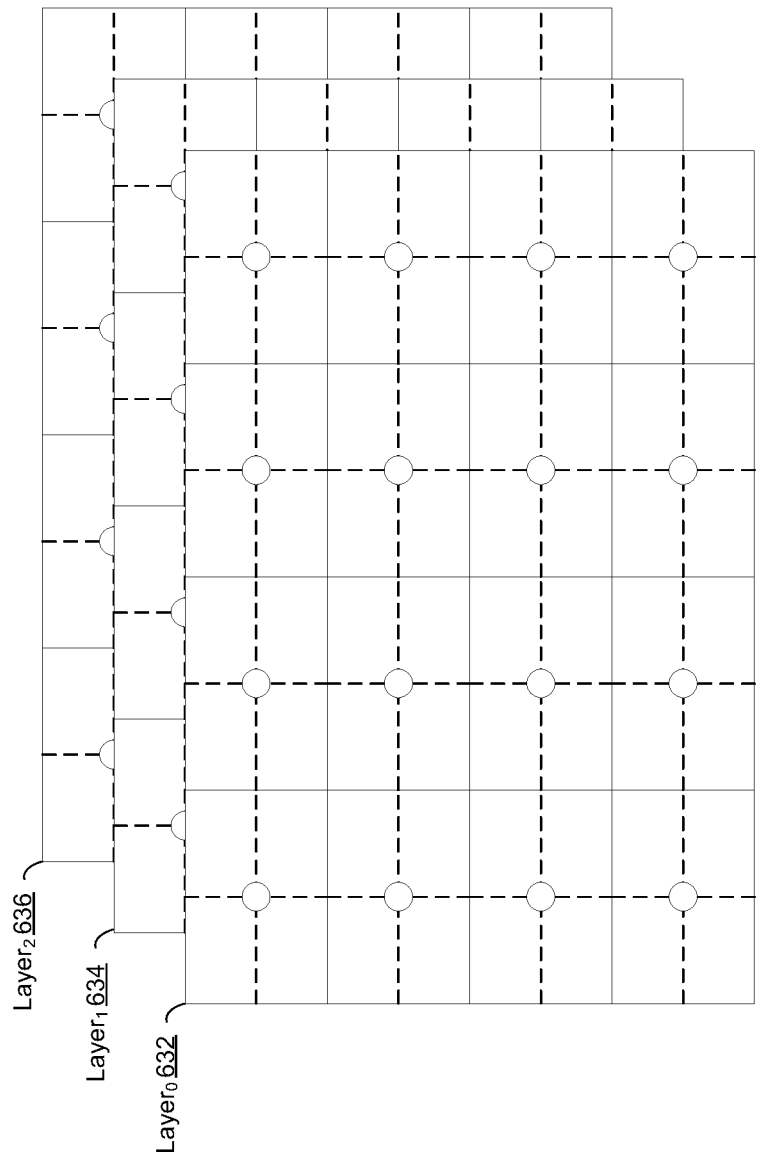
FIG. 6B illustrates example layering associated with the tessellated image frame in FIG. 6A in accordance with some implementations.

FIG. 6B illustrates example layering associated with the image frame 600 in FIG. 6A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 6B illustrates a plurality of layers associated with the image frame 600 in FIG. 6A. More specifically, FIG. 6B illustrates $layer_0$ 632, $layer_1$ 634, and $layer_2$ 636 for the image frame 600 in FIG. 6A. One of ordinary skill in the art will appreciate that even though three layers are show in FIG. 6B, the image frame 600 may be layered in myriad ways in various other implementations.

In some implementations, after tessellating the image frame into a plurality of tiles to compartmentalize the frame-wise and/or pixel-wise metadata, the computing system or a component thereof (e.g., the subdivision engine 514 in FIG. 5) may also layer the tiled metadata. For example, each layer of tiled metadata may correspond to a different color or frequency channel such as separate RGB channels, YCbCr channels, ICtCp channels, or the like.

Figure 7A:
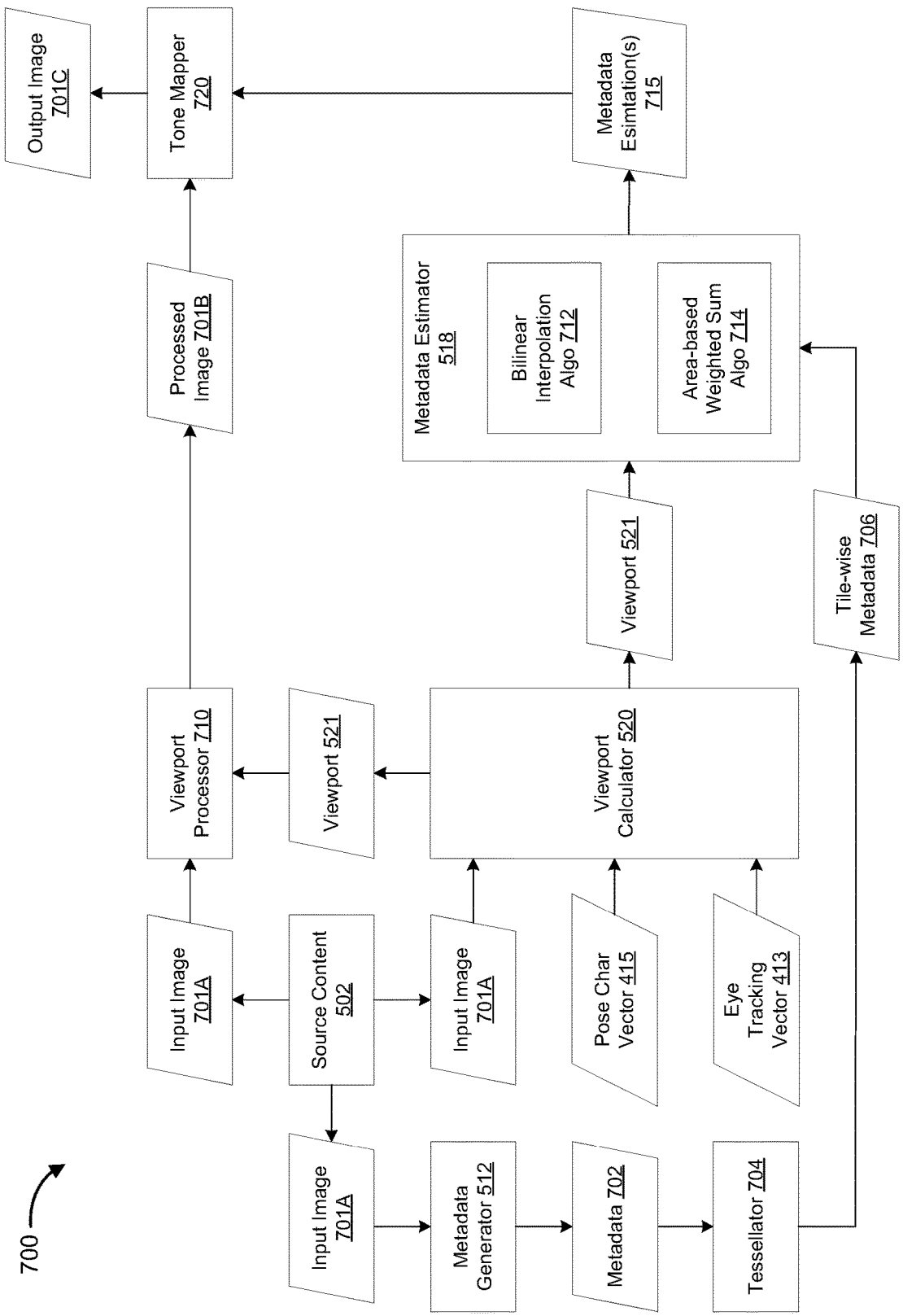
FIG. 7A is a block diagram of an example tile-based tone mapping architecture in accordance with some implementations.

FIG. 7A is a block diagram of an example tile-based tone mapping architecture 700 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. FIG. 7A is similar to and adapted from FIG. 5. As such, similar references numbers are used between FIGS. 5 and 7A. According to some implementations, the tile-based tone mapping architecture 700 is a tone map specific implementation of the image processing architecture 500 in FIG. 5, where the subdivision engine 514 in FIG. 5 corresponds to a tessellator 704 in FIG. 7A and the downstream application/algorithm 530 in FIG. 5 corresponds to a tone mapper 720 in FIG. 7.

As noted above, in some implementations, a computing system with one or more processors and non-transitory memory performs the processes and/or functions or the tile-based tone mapping architecture 700. In some implementations, the computing system corresponds to the electronic device 120 shown in FIGS. 1 and 3; the controller 110 in FIGS. 1 and 2; or a suitable combination thereof.

As shown in FIG. 7A, the tile-based tone mapping architecture 700 obtains (e.g., receives, retrieves, captures, etc.) source content 502, including an input image 701A, from a local source and/or a remote source. For example, the source content 502 corresponds to an image frame or an image stream. As another example, the source content 502 corresponds to one or more keyframes.

With further reference to FIG. 7A, the viewport calculator 520 determines a viewport 521 of the user relative to the input image 701A based at least in part on the eye tracking vector 413 or the pose characterization vector 415 described above with reference to FIG. 4. In some implementations, the viewport 521 corresponds to a current FOV of the user relative to the input image 701A. In some implementations, the viewport 521 corresponds to a viewing frustum of the user relative to the input image 701A.

In FIG. 7A, the metadata generator 512 generates metadata 702 for the input image 701A on a frame-wise basis and/or a pixel-wise basis. According to some implementations, the tessellator 704 divides the metadata 702 into a plurality of tiles as described above with reference to FIG. 6A. In some implementations, the tessellator 704 also generates tile-wise metadata 706 for the plurality of tiles based on the metadata 702 (e.g., the pixel-wise and/or frame-wise metadata). For example, the tessellator 704 generates tile-wise metadata 706 for a subject tile by averaging the pixel-wise metadata associated with the subject tile. As another example, the tessellator 704 generates tile-wise metadata 706 for a subject tile by averaging the pixel-wise metadata associated with the subject tile and its neighboring tiles. As yet another example, the tessellator 704 generates tile-wise metadata 706 for a subject tile by averaging the pixel-wise metadata associated with the subject tile and its neighboring tiles, where the pixel-wise metadata for the subject tile is assigned a first weight and the pixel-wise metadata for the neighboring tiles is assigned a second weight less than the first weight.

As shown in FIG. 7A, the metadata estimator 518 generates one or more metadata estimations 715 by performing an estimation algorithm on the tile-wise metadata 706 based on the viewport 521. For example, the estimation algorithm corresponds to one of the bilinear interpolation algorithm 712 described below with reference to FIG. 8B, the area-based weighted sum algorithm 714 described below with reference to FIG. 8C, or the like.

According to some implementations, the one or more metadata estimations 715 are associated with expected inputs and/or outputs of the tone mapper 720. For example, the one or more metadata estimations 715 correspond to a predicted minimum light level for a subset of tiles associated with the viewport 521 from among the plurality of tiles, a predicted maximum light level for the subset of tiles associated with the viewport 521 from among the plurality of tiles, an average light level or the subset of tiles associated with the viewport 521 from among the plurality of tiles, and a light level variance or the subset of tiles associated with the viewport 521 from among the plurality of tiles.

With further reference to FIG. 7A, the viewport processor 710 generates a processed image 701B by converting the viewport 521 to image space based on a projection model and selecting a portion of the input image 701A as the processed image 701B based on the converted viewport. In FIG. 7A, the tone mapper 720 generates an output image 701C by applying a tone map to the processed image 701B based on the one or more metadata estimations 715.

Figure 7B:
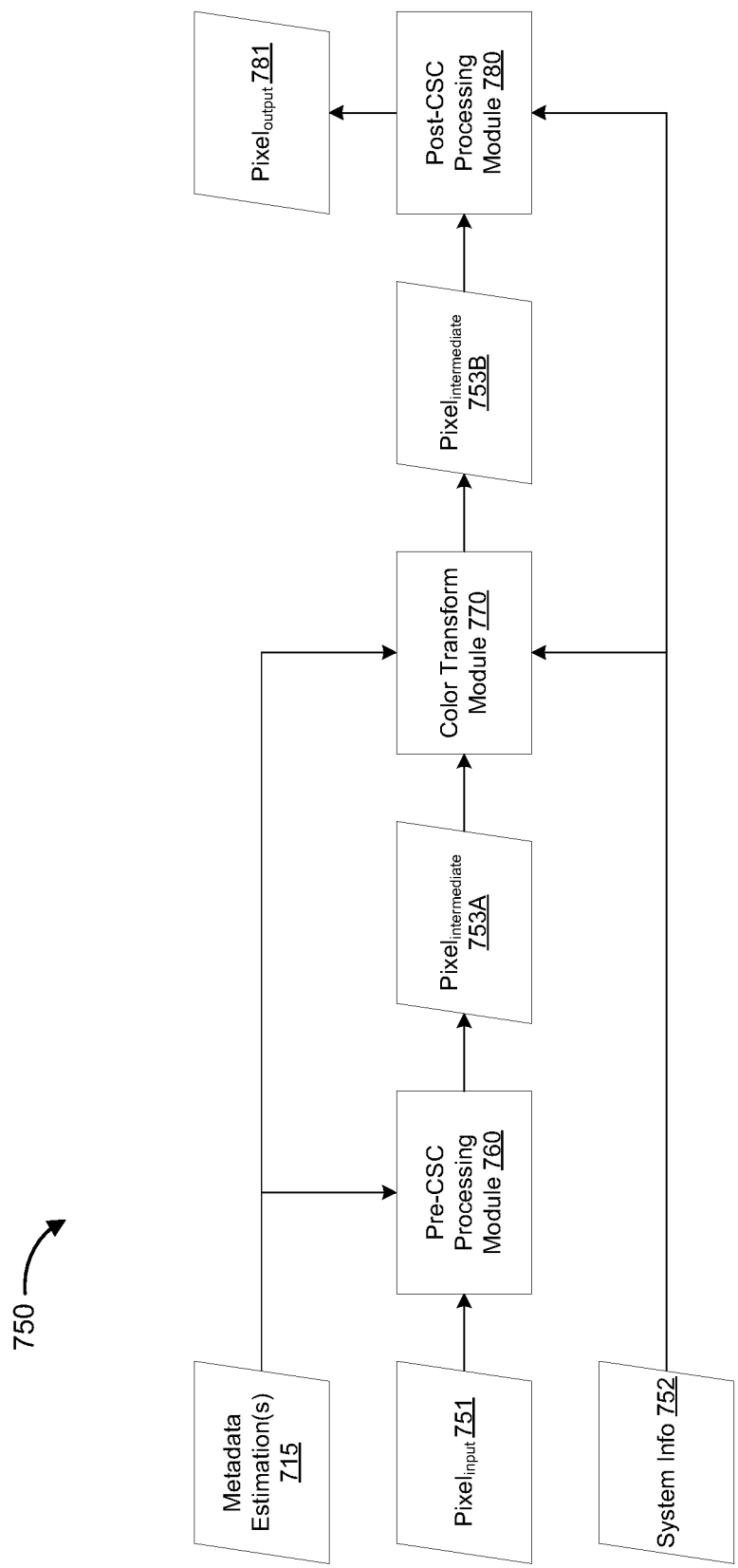
FIG. 7B is a block diagram of an example color space conversion (CSC) process associated with the tile-based tone mapping architecture in FIG. 7A in accordance with some implementations.

FIG. 7B is a block diagram of an example color space conversion (CSC) process 750 associated with the tile-based tone mapping architecture 700 in FIG. 7A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. FIG. 7B is similar to and adapted from FIG. 7A. As such, similar references numbers are used between FIGS. 7A and 7B. For example, the CSC process 750 is performed by the tone mapper 720 in FIG. 7A.

As shown in FIG. 7B, a pre-CSC processing module 760 generates $pixel_{intermediate}$ 753A by performing one or more functions or operations on $pixel_{input}$ 751 (e.g., an input pixel stream associated with the cropped image 702B in FIG. 7A) based on the one or more metadata estimations 715. For example, the one or more functions or operations performed by the pre-CSC processing module 760 correspond to warping, color correction, gamma correction, sharpening, noise reduction, white balance, and/or the like.

With further reference to FIG. 7B, a color transform module 770 generates $pixel_{intermediate}$ 753B by performing a mapping from a first color space (e.g., RGB) to a second color space (e.g., ICtCp) based on the one or more metadata estimations 715 and system information 752 (e.g., a resolution for a display device, an aspect ratio for the display device, a particular color space—the second color space—for the display device, and/or the like.)

In FIG. 7B, the post-CSC processing module 780 generates $pixel_{output}$ 781 (e.g., an output pixel stream associated with the output image 702C in FIG. 7A) by performing one or more functions or operations on $pixel_{intermediate}$ 753B based on system information 752. For example, the one or more functions or operations performed by the post-CSC processing module 780 correspond to warping, color correction, gamma correction, sharpening, noise reduction, white balance, and/or the like.

Figure 8A:
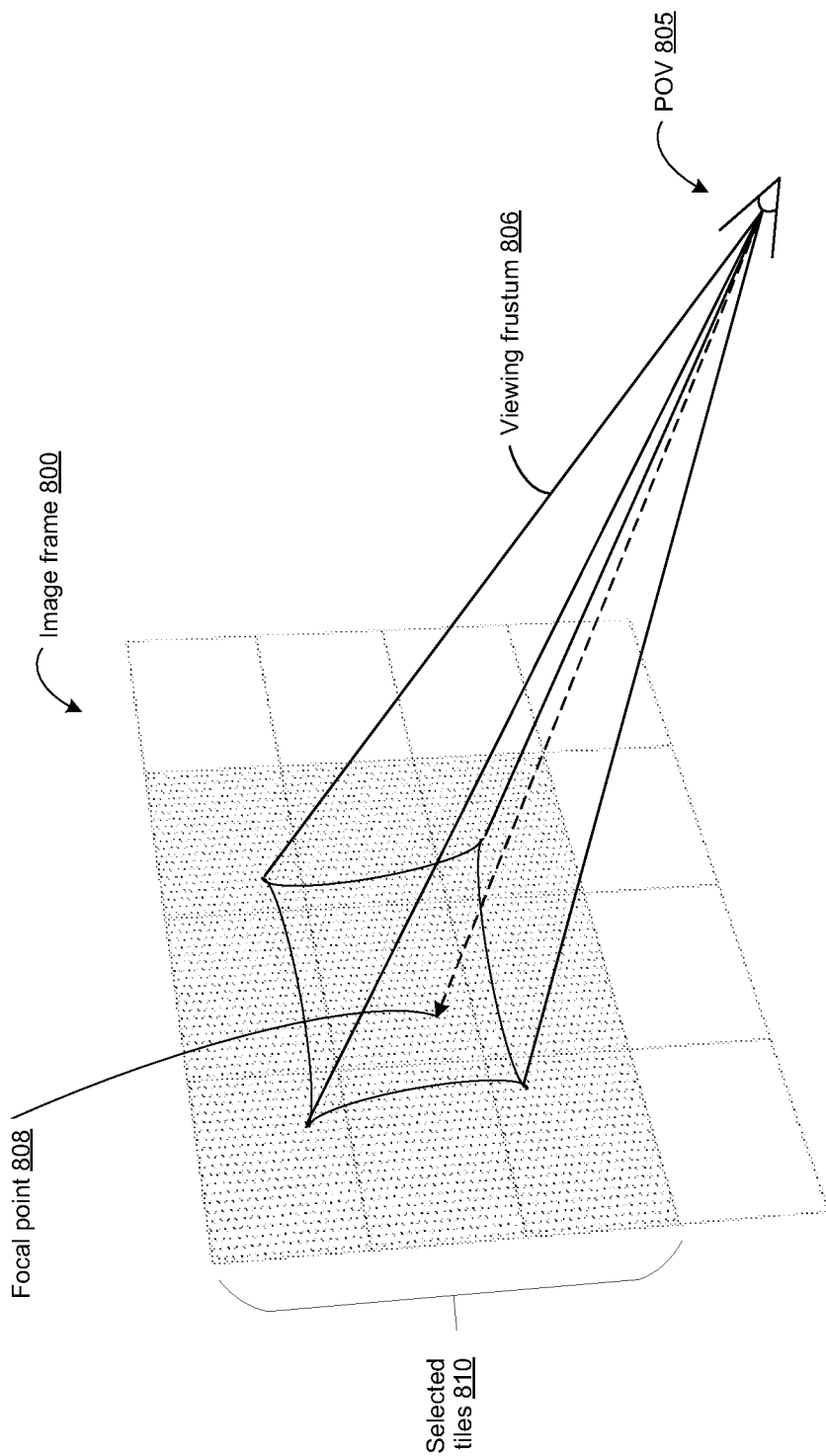
FIG. 8A illustrates an example viewing frustum relative to an image frame in accordance with some implementations.

FIG. 8A illustrates an example viewing frustum 806 relative to an image frame 800 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the computing system or a component thereof (e.g., the viewport calculator 520 in FIGS. 5 and 7A) determines a viewing frustum 806 associated with a current point-of-view (POV) 805 relative to the image frame 800 based on the eye tracking vector 413 and/or the pose characterization vector 415 described above with reference to FIG. 4. In some implementations, the computing system or a component thereof (e.g., the eye tracking engine 412 in FIG. 4) also determines a focal point 808 relative to the image frame 800 based on the eye tracking vector 413 and/or the pose characterization vector 415 (described above with reference to FIG. 4) associated with a current POV 805.

As shown in FIG. 8A, the computing system or a component thereof (e.g., the subdivision engine 514 in FIG. 5, or the tessellator 704 in FIG. 7A) divides the image frame 800 into a plurality of tiles. For example, the plurality of tiles in FIG. 8A corresponds to a 4×4 matrix of tiles associated with N×M pixel regions of the image frame 800. According to some implementations, the computing system or a component thereof (e.g., the metadata estimator 518 in FIGS. 5 and 7A) selects tiles 810 from among the plurality of tiles of the image frame 800 based on the viewing frustum 806 for a metadata estimation algorithm. For example, the metadata estimator 518 selects the tiles 810 from among the plurality of tiles of the image frame 800 because the tiles 810 are fully or partially within the viewing frustum 806. In some implementations, the computing system or a component thereof (e.g., the metadata estimator 518 in FIGS. 5 and 7A) selects a tile that includes the focal point 808 from among the plurality of tiles of the image frame 800 for the metadata estimation algorithm.

Figure 8B:
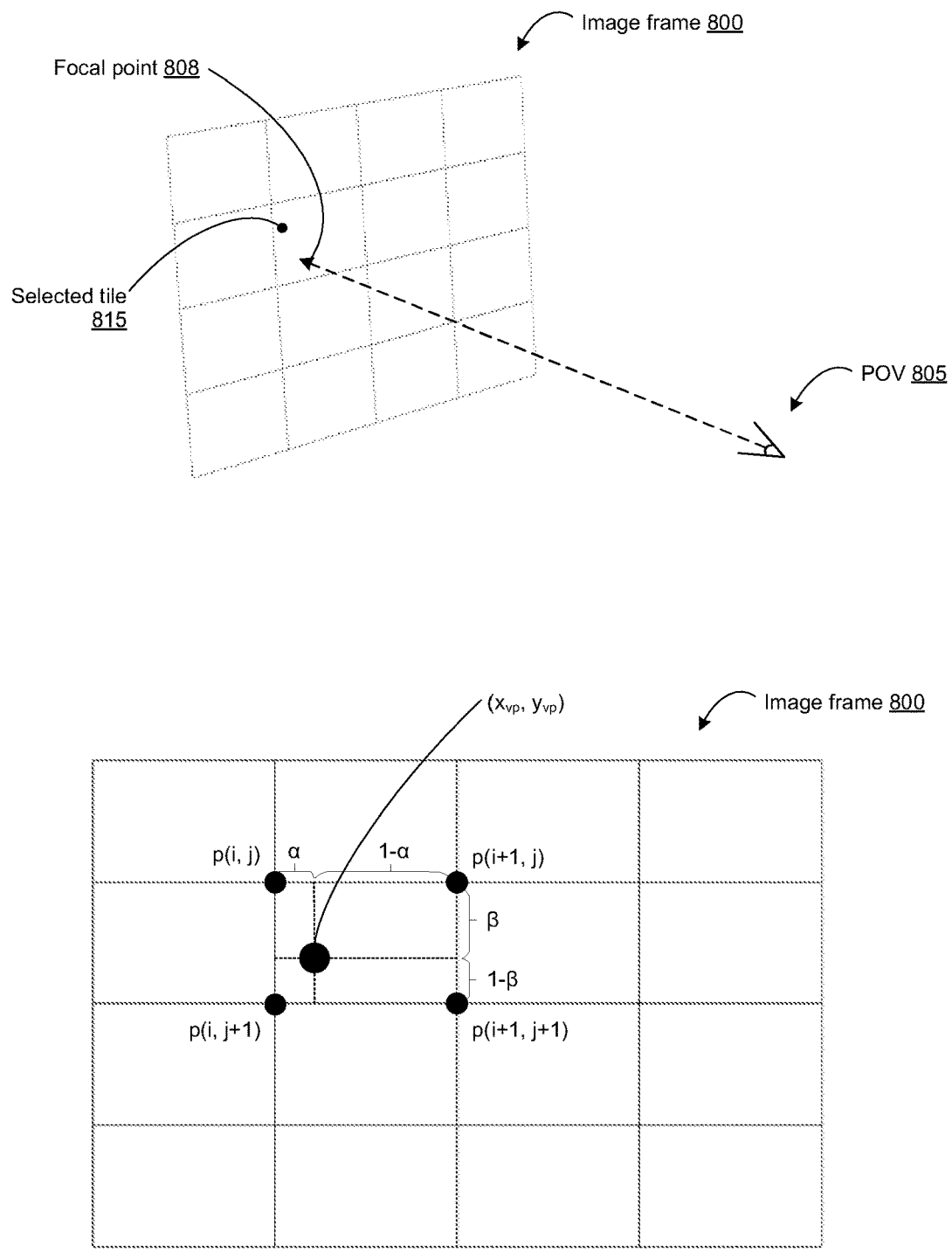
FIG. 8B illustrates a bilinear interpolation algorithm for metadata estimation in accordance with some implementations.

FIG. 8B illustrates a bilinear interpolation algorithm 712 for metadata estimation in accordance with some implementations. While certain specific features are illustrated, those skilled in the art will appreciate from the present disclosure that various other features have not been illustrated for the sake of brevity, and so as not to obscure more pertinent aspects of the implementations disclosed herein. FIG. 8B is similar to and adapted from FIG. 8A. As such, similar references numbers are used between FIGS. 8A and 8B.

In some implementations, the computing system or a component thereof (e.g., the metadata estimator 518 in FIGS. 5 and 7A) selects a tile 815 that includes the focal point 808 from among the plurality of tiles of the image frame 800 for the bilinear interpolation algorithm 712. In various implementations, the bilinear interpolation algorithm 712 shown in FIG. 8B estimates a value for a particular metadata parameter $p_{vp}$ based on the focal point 808 associated with the coordinates $(x_{vp}, y_{vp})$ within the selected tile 815.

The bilinear interpolation algorithm 712 generates an estimated value for a particular metadata parameter $p_{vp}$ by bilinearly interpolating with respect to the nearest four neighbor points $p_{i,j}$, $p_{i+1,j}$, $p_{i,j+1}$, and $p_{i+1,j+1}$ around the coordinates $(x_{vp}, y_{vp})$ based on equation (1) below:

$$p_{vp} = (1-\beta) \times ((1-\alpha) \times p_{i,j} + \alpha \times p_{i+1,j}) + \beta \times ((1-\alpha) \times p_{i,j+1} + \alpha \times p_{i+1,j+1}) \quad (1)$$

In equation (1), α corresponds to a horizontal distance from a left edge of the selected tile 815 to $(x_{vp}, y_{vp})$. β corresponds to a vertical distance from a top edge of the selected tile 815 to $(x_{vp}, y_{vp})$.

Figure 8C:
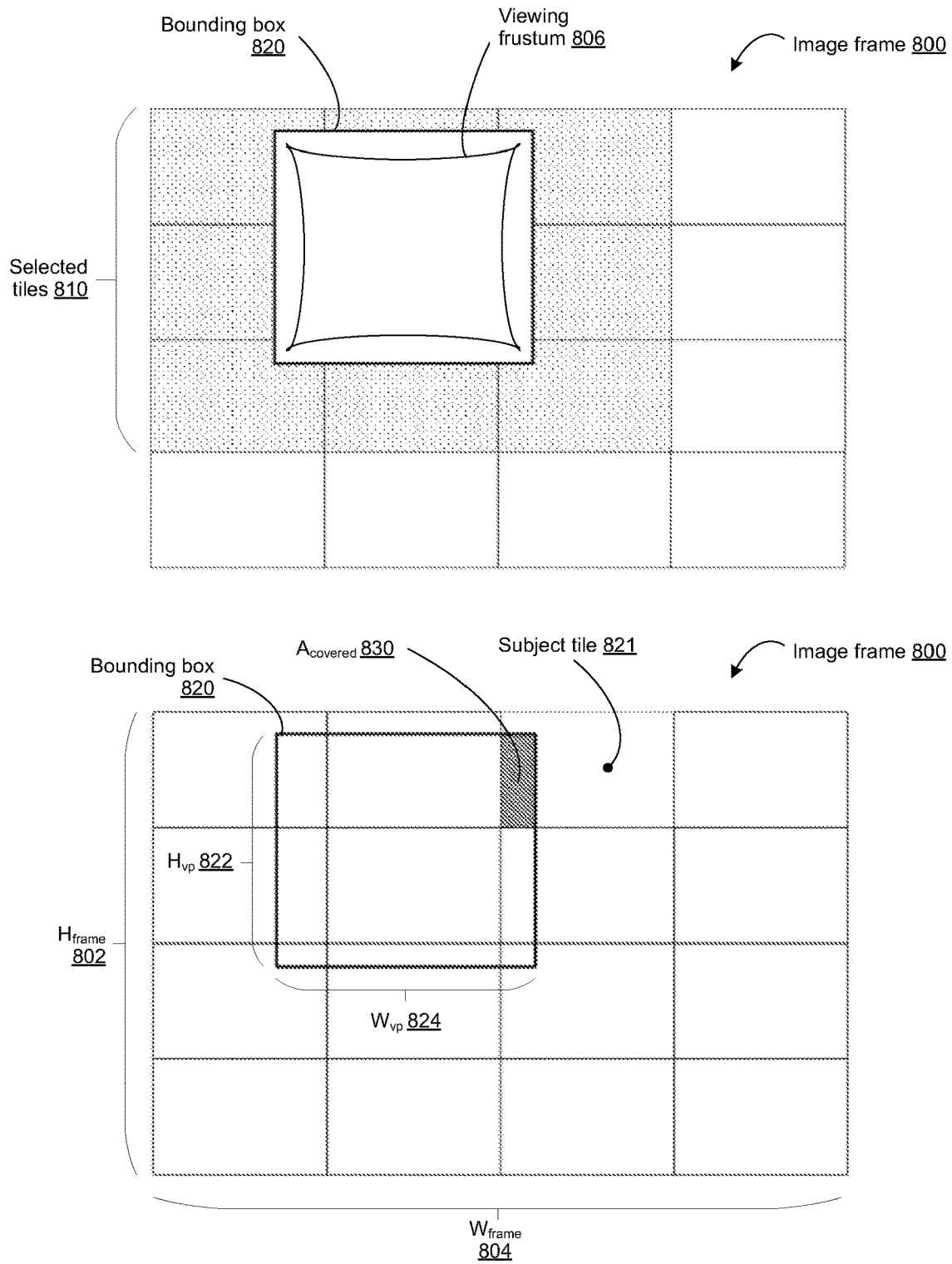
FIG. 8C illustrates an area-based weighted sum algorithm for metadata estimation in accordance with some implementations.

FIG. 8C illustrates an area-based weighted sum algorithm 714 for metadata estimation in accordance with some implementations. While certain specific features are illustrated, those skilled in the art will appreciate from the present disclosure that various other features have not been illustrated for the sake of brevity, and so as not to obscure more pertinent aspects of the implementations disclosed herein. FIG. 8C is similar to and adapted from FIG. 8A. As such, similar references numbers are used between FIGS. 8A and 8C.

As described above with reference to FIG. 8A, in some implementations, the computing system or a component thereof (e.g., the viewport calculator 520 in FIGS. 5 and 7A) determines the viewing frustum 806 associated with the current point-of-view (POV) 805 relative to the image frame 800 based on the eye tracking vector 413 and/or the pose characterization vector 415 described above with reference to FIG. 4. According to some implementations, the computing system or a component thereof (e.g., the viewport calculator 520 in FIGS. 5 and 7A) optionally generates a bounding box 820 surrounding the viewing frustum 806, where the bounding box 820 provides a buffer of at least Z pixels from the edges of the viewing frustum 806.

As shown in FIG. 8C, the image frame 800 is associated with a height value $H_{frame}$ 802 and a width value $W_{frame}$ 804. Furthermore, the bounding box 820 in FIG. 8C is associated with a height value $H_{vp}$ 822 in pixels and a width value $W_{vp}$ 824 in pixels.

According to some implementations, the computing system or a component thereof (e.g., the metadata estimator 518 in FIGS. 5 and 7A) selects tiles 810 (sometimes referred to herein as the selected tile set {T}) from among the plurality of tiles of the image frame 800 based on the bounding box 820 for the area-based weighted sum algorithm 714. For example, the metadata estimator 518 selects the tiles 810 from among the plurality of tiles of the image frame 800 because the tiles 810 are fully or partially within the bounding box 820.

As shown in FIG. 8C, a subject tile 821 from the selected tile set {T} is partially located within the bounding box 820, where $A_{covered}$ 830 of the subject tile 821 is within the bounding box 820. In some implementations, the contribution of the subject tile 821 to the metadata estimation is based on the extent of $A_{covered}$ 830 relative to the area of the bounding box 820 as shown by equation (2) below:

$$c^{(t)} = \frac{A^{(t)}}{W_{vp} \times H_{vp}} \quad (2)$$

In equation (2), $A^{(t)}$ corresponds to a number of pixels in $A_{covered}$ 830 from the subject tile 821 that are located within the bounding box 820. $c^{(t)}$ corresponds to the contribution factor of the metadata from the subject tile 821.

According to some implementations, the area-based weighted sum algorithm 714 generates an estimated value for a particular metadata parameter $p_{vp}$ by calculating the weighted sum of the metadata contributions from each of the selected tiles 810 according to equation (3) below:

$$p_{vp} = \sum_{\forall t \in T} c^{(t)} \times p^{(t)} \quad (3)$$

Equation (3) sums over all tiles that are elements of the selected tile set {T}, where $c^{(t)}$ corresponds to the contribution factor associated with a particular tile (t), and $p^{(t)}$ corresponds to a value for a particular metadata parameter with respect to the particular tile (t).

Figure 9A:
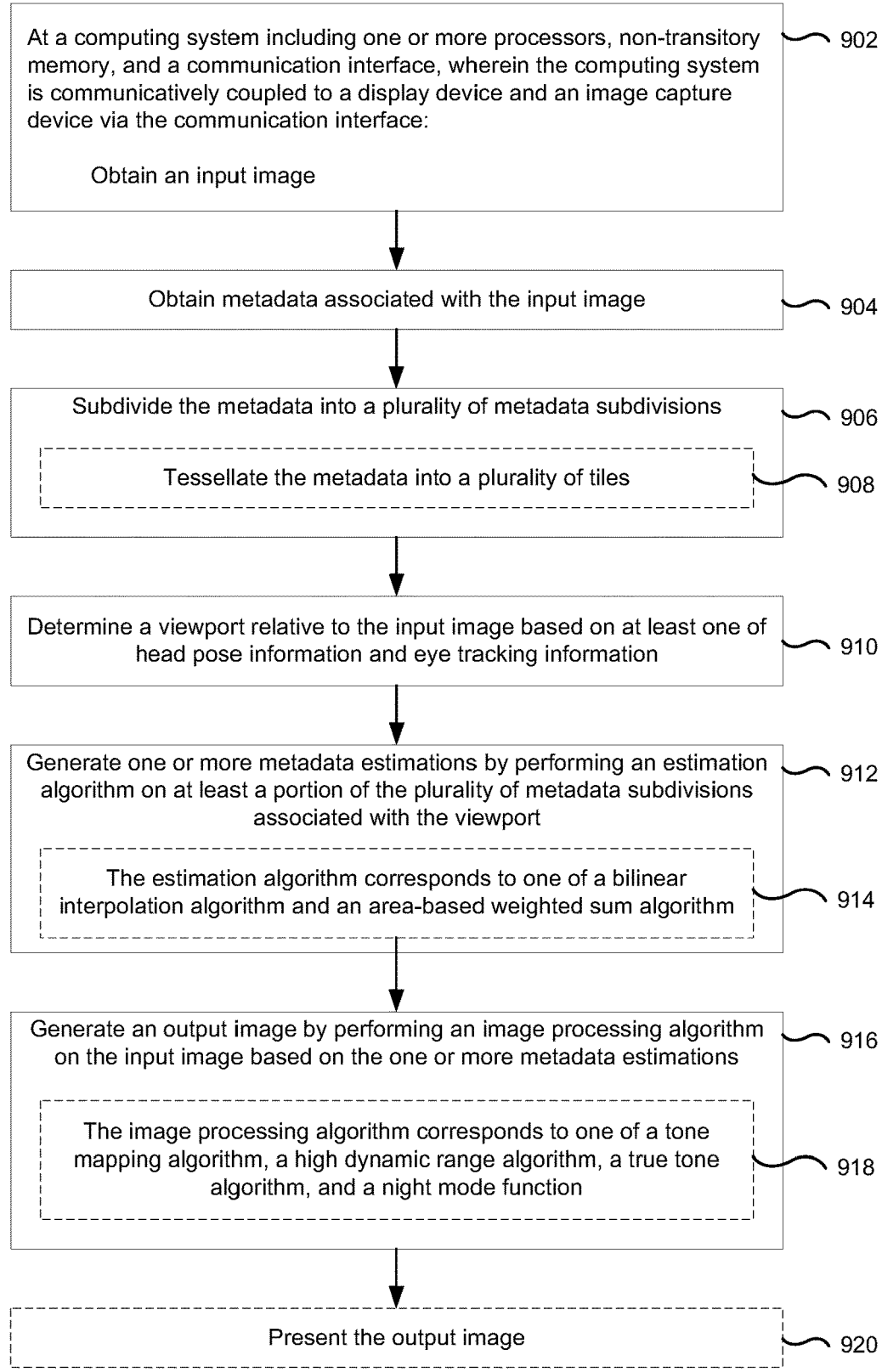
FIG. 9A illustrates a flowchart representation of a method of generating metadata estimations based on metadata subdivisions in accordance with some implementations.

FIG. 9A illustrates a flowchart representation of a method 900 of generating metadata estimations based on metadata subdivisions in accordance with some implementations. In various implementations, the method 900 is performed at a computing system including one or more processors, non-transitory memory, and a communication interface, wherein the computing system is communicatively coupled to a display device, an image capture device, and optionally one or more input devices via the communication interface (e.g., the electronic device 120 shown in FIGS. 1 and 3; the controller 110 in FIGS. 1 and 2; or a suitable combination thereof). In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, one or more microphones, and/or the like.

As discussed above, per frame metadata is often available for image processing algorithms. However, processing the per frame metadata may consume significant resources and produce a sub-par result. The method described herein improves rendering quality and the efficiency of HDR by limiting its usage to tile-wise metadata from tiles selected based on the current viewport. This more efficient usage of tile-wise metadata for HDR reduces resource consumption and improves rendering quality.

As represented by block 902, the method 900 includes obtaining (e.g., receiving, retrieving, generating, capturing, etc.) an input image. In some implementations, obtaining the input image includes obtaining the input image from a library of pre-existing content stored by a local source or a remote source. In some implementations, obtaining the input image includes capturing the input image via the image capture device.

As one example, with reference to FIG. 5, the image processing architecture 500 obtains (e.g., receives, retrieves, captures, etc.) source content 502 from a local source and/or a remote source. For example, the source content 502 corresponds to an image frame, an image stream, a portion of video content, or the like. As another example, the source content 502 corresponds to one or more keyframes. As another example, with reference to FIG. 7A, the tile-based tone mapping architecture 700 obtains (e.g., receives, retrieves, captures, etc.) source content 502, including an input image 701A, from a local source and/or a remote source.

As represented by block 904, the method 900 includes obtaining (e.g., receiving, retrieving, generating, determining, etc.) metadata associated with the input image. As one example, with reference to FIG. 5, the image processing architecture 500 or a component thereof (e.g., the metadata generator 512) generates metadata 513 for the source content 502 on a frame-wise basis and/or a pixel-wise basis. As another example, with reference to FIG. 7A, the tile-based tone mapping architecture 700 or a component thereof (e.g., the metadata generator 512) generates metadata 702 for the input image 701A on a frame-wise basis and/or a pixel-wise basis.

For example, the frame-wise metadata includes a minimum light level, a maximum light level, an average light level, a light level variance, color information, contrast information, texture information, saturation information, and/or the like for the image frame. For example, the pixel-wise metadata includes a light level, color values, color information, contrast information, texture information, saturation information, and/or the like for each pixel of the image frame. According to some implementations, the types and structure of the metadata generated by the metadata generator 512 is dependent on user preferences, user history, user context (e.g., current body pose, head pose, motion state, etc.), environment context (e.g., ambient lighting conditions, background texture/frequency, and/or the like associated with the physical environment 105), one or more labels for objects recognized within the physical environment 105, the current foreground application, the inputs/outputs of the downstream application/algorithm 530, and/or the like.

As represented by block 906, the method 900 includes subdividing the metadata into a plurality of metadata subdivisions. As one example, with reference to FIG. 5, the image processing architecture 500 or a component thereof (e.g., the subdivision engine 514) subdivides the metadata 513 into deterministic or non-deterministic subdivisions such as a plurality of N×M pixel regions. As one example, the subdivision engine 514 tessellates the metadata 513 into a plurality of tiles. In some implementations, the subdivision engine 514 also generates subdivision-wise (e.g., tile-wise) metadata 515 based on the pixel-wise and/or frame-wise metadata.

For example, the subdivision engine 514 generates tile-wise metadata for a subject tile by averaging the pixel-wise metadata associated with the subject tile. As another example, the subdivision engine 514 generates tile-wise metadata for a subject tile by averaging the pixel-wise metadata associated with the subject tile and its neighboring tiles. As yet another example, the subdivision engine 514 generates tile-wise metadata for a subject tile by averaging the pixel-wise metadata associated with the subject tile and its neighboring tiles, where the pixel-wise metadata for the subject tile is assigned a first weight and the pixel-wise metadata for the neighboring tiles is assigned a second weight less than the first weight. One of ordinary skill in the art will appreciate that the subdivisions (e.g., the plurality of tiles) and subdivision specific metadata (e.g., the tile-wise metadata) may be generated and/or structured in myriad ways.

According to some implementations, as represented by block 908, subdividing the metadata into a plurality of metadata subdivisions includes tessellating the metadata into a plurality of tiles. As one example, with reference to FIG. 7A, the tile-based tone mapping architecture 700 or a component thereof (e.g., the tessellator 704) divides the metadata 702 into a plurality of tiles as described above with reference to FIG. 6A. In some implementations, the tessellator 704 also generates tile-wise metadata 706 for the plurality of tiles based on the metadata 702 (e.g., the pixel-wise and/or frame-wise metadata). For example, the tessellator 704 generates tile-wise metadata 706 for a subject tile by averaging the pixel-wise metadata associated with the subject tile. As another example, the tessellator 704 generates tile-wise metadata 706 for a subject tile by averaging the pixel-wise metadata associated with the subject tile and its neighboring tiles. As yet another example, the tessellator 704 generates tile-wise metadata 706 for a subject tile by averaging the pixel-wise metadata associated with the subject tile and its neighboring tiles, where the pixel-wise metadata for the subject tile is assigned a first weight and the pixel-wise metadata for the neighboring tiles is assigned a second weight less than the first weight.

As represented by block 910, the method 900 includes determining a viewport relative to the input image based on at least one of head pose information and eye tracking information. As one example, with reference to FIG. 5, the image processing architecture 500 or a component thereof (e.g., the viewport calculator 520) determines a viewport 521 of the user relative to the source content 502 based at least in part on the eye tracking vector 413 and/or the pose characterization vector 415 described above with reference to FIG. 4. In some implementations, the viewport 521 corresponds to a current FOV of the user relative to the source content 502. In some implementations, the viewport 521 corresponds to a viewing frustum of the user relative to the source content 502.

As another example, with reference to FIG. 7A, the tile-based tone mapping architecture 700 or a component thereof (e.g., the viewport calculator 520) determines a viewport 521 of the user relative to the input image 701A based at least in part on the eye tracking vector 413 or the pose characterization vector 415 described above with reference to FIG. 4. In some implementations, the viewport 521 corresponds to a current FOV of the user relative to the input image 701A. In some implementations, the viewport 521 corresponds to a viewing frustum of the user relative to the input image 701A.

In some implementations, the method 900 includes: obtaining, via the one or more input devices, the head pose information and the eye tracking information. As one example, with reference to FIG. 4, the computing device or a portion thereof (e.g., the head/body pose tracking engine 414) obtains (e.g., receives, retrieves, or determines/generates) a pose characterization vector 415 and updates the pose characterization vector 415 over time in response to detecting changes to the head/body pose of the user 150. In some implementations, obtaining the pose characterization vector 415 corresponds to generating the pose characterization vector 415 based on sensor data collected by the computing system. In some implementations, the sensor data is collected by a combination of optional remote sensors, the electronic device 120, and the controller 110. As shown in FIG. 4, for example, the input processing architecture 400 generates the pose characterization vector 415 based on the local sensor data 403 and/or the remote sensor data 405.

As another example, with reference to FIG. 4, the computing device or a portion thereof (e.g., the eye tracking engine 412) obtains (e.g., receives, retrieves, or determines/generates) an eye tracking vector 413 and updates the eye tracking vector 413 over time in response to detecting changes to the gaze direction of the user 150. In some implementations, obtaining the eye tracking vector 413 corresponds to generating the pose eye tracking vector 413 based on sensor data collected by the computing system. In some implementations, the sensor data is collected by a combination of optional remote sensors, the electronic device 120, and the controller 110. As shown in FIG. 4, for example, the input processing architecture 400 generates the eye tracking vector 413 based on the local sensor data 403 and/or the remote sensor data 405.

As represented by block 912, the method 900 includes generating one or more metadata estimations by performing an estimation algorithm on at least a portion of the plurality of metadata subdivisions associated with the viewport. As one example, with reference to FIG. 5, the image processing architecture 500 or a component thereof (e.g., the metadata estimator 518) generates a metadata estimation by performing an estimation algorithm on the subdivision-wise metadata 515 based on the viewport 521. For example, the estimation algorithm corresponds to one of the bilinear interpolation algorithm 712 described below with reference to FIG. 8B, the area-based weighted sum algorithm 714 described below with reference to FIG. 8C, or the like. One of ordinary skill in the art will appreciate that the metadata estimator 518 may employ various spatiotemporal estimation algorithms or techniques.

As another example, with reference to FIG. 7A, the tile-based tone mapping architecture 700 or a component thereof (e.g., the metadata estimator 518) generates one or more metadata estimations 715 by performing an estimation algorithm on the tile-wise metadata 706 based on the viewport 521. For example, the estimation algorithm corresponds to one of the bilinear interpolation algorithm 712 described below with reference to FIG. 8B, the area-based weighted sum algorithm 714 described below with reference to FIG. 8C, or the like.

According to some implementations, as represented by block 914, the estimation algorithm corresponds to one of a bilinear interpolation algorithm and an area-based weighted sum algorithm. The bilinear interpolation algorithm 712 is described in more detail above with reference to FIGS. 8A and 8B. The area-based weighted sum algorithm 714 is described in more detail above with reference to FIGS. 8A and 8C.

In some implementations, the portion of the plurality of metadata subdivisions corresponds to a subset of tiles from among the plurality of tiles that at least partially overlap the viewport. As one example, with reference to FIG. 8A, the computing system or a component thereof (e.g., the metadata estimator 518 in FIGS. 5 and 7A) selects tiles 810 from among the plurality of tiles of the image frame 800 based on the viewing frustum 806 for the metadata estimation algorithm.

In some implementations, the portion of the plurality of metadata subdivisions corresponds to a subset of tiles from among the plurality of tiles that at least partially overlap a bounding box surrounding the viewport. As one example, with reference to FIG. 8C, the computing system or a component thereof (e.g., the metadata estimator 518 in FIGS. 5 and 7A) selects tiles 810 (sometimes referred to herein as the selected tile set {T}) from among the plurality of tiles of the image frame 800 based on the bounding box for the metadata estimation algorithm.

As represented by block 916, the method 900 includes generating an output image by performing an image processing algorithm on the input image based on the one or more metadata estimations. According to some implementations, as represented by block 918, the image processing algorithm corresponds to one of a tone mapping algorithm, an HDR algorithm, a true tone algorithm, and a night mode function.

As one example, with reference to FIG. 5, the image processing architecture 500 or a component thereof (e.g., the downstream application/algorithm 530) performs an application, algorithm, function, process, etc. on the source content 502 based on the metadata estimation from the metadata estimator 518. For example, the downstream application/algorithm 530 corresponds to a tone mapping algorithm, a night mode function, a true tone algorithm, a high dynamic range (HDR) algorithm, and/or the like.

According to some implementations, the metadata associated with the input image includes obtaining the metadata associated with the input image based on at least one of one or more inputs to the image processing algorithm or one or more outputs from the image processing algorithm. In some implementations, the image processing algorithm corresponds to a tone mapping algorithm, and wherein each of the plurality of metadata subdivisions includes at least one of a minimum light level per metadata subdivision, a maximum light level per metadata subdivision, an average light level per metadata subdivision, and a light level variance per metadata subdivision.

As one example, with reference to FIG. 7A, the one or more metadata estimations 715 may correspond to or depend on expected inputs and/or outputs of the tone mapper 720. For example, the one or more metadata estimations 715 correspond to a predicted minimum light level for a subset of tiles associated with the viewport 521 from among the plurality of tiles, a predicted maximum light level for the subset of tiles associated with the viewport 521 from among the plurality of tiles, an average light level or the subset of tiles associated with the viewport 521 from among the plurality of tiles, and a light level variance or the subset of tiles associated with the viewport 521 from among the plurality of tiles.

According to some implementations, as represented by block 920, the method 900 includes presenting, via the display device, the output image. For example, the electronic device 120 or a component thereof (e.g., the presenter 346 in FIG. 3) presents the output image via the one or more displays 312.

FIG. 9B illustrates a flowchart representation of a method 930 of generating metadata subdivisions in accordance with some implementations. In various implementations, the method 930 is performed at a controller (e.g., the controller 110 in FIGS. 1 and 2, or the like) including one or more processors, non-transitory memory, and a communication interface, wherein the controller is communicatively coupled to an electronic device (e.g., the electronic device 120 in FIGS. 1 and 3, or the like) with a display device and an input capture device via the communication interface. In some implementations, the method 930 is performed by processing logic, including hardware, firmware, software, or a combination thereof. In some implementations, the method 930 is performed by a processor executing code stored in a non-transitory computer-readable medium (e.g., a memory). In some implementations, the controller corresponds to a central server, a cloud server, a home server, or a content delivery network (CDN) device.

As represented by block 932, the method 930 includes obtaining an input image. In some implementations, obtaining the input image includes obtaining the input image from a library of pre-existing content stored by a local source or a remote source. As one example, with reference to FIG. 5, the image processing architecture 500 obtains (e.g., receives, retrieves, captures, etc.) source content 502 from a local source and/or a remote source. In some implementations, obtaining the input image includes obtaining the input image from the electronic device via the communication interface, wherein the input image was captured by the image capture device of the electronic device. In some implementations, the input image corresponds to an image frame, an image stream, a portion of video content, or the like.

As represented by block 934, the method 930 includes obtaining metadata associated with the input image. For example, with reference to FIG. 5, the image processing architecture 500 or a component thereof (e.g., the metadata generator 512) generates metadata 513 for the source content 502 on a frame-wise basis and/or a pixel-wise basis.

In some implementations, obtaining the metadata associated with the input image includes obtaining the metadata associated with the input image based on at least one of one or more inputs to a downstream image processing algorithm or one or more outputs from the downstream image processing algorithm. In some implementations, the downstream image processing algorithm corresponds to one of a tone mapping algorithm, a high dynamic range algorithm, a true tone algorithm, and a night mode function.

As represented by block 936, the method 930 includes subdividing the metadata into a plurality of metadata subdivisions. As one example, with reference to FIG. 5, the image processing architecture 500 or a component thereof (e.g., the subdivision engine 514) subdivides the metadata 513 into deterministic or non-deterministic subdivisions such as a plurality of N×M pixel regions. As one example, the subdivision engine 514 tessellates the metadata 513 into a plurality of tiles. In some implementations, the subdivision engine 514 also generates subdivision-wise (e.g., tile-wise) metadata 515 based on the pixel-wise and/or frame-wise metadata. In some implementation, each of the plurality of metadata subdivisions includes at least one of a minimum light level per metadata subdivision, a maximum light level per metadata subdivision, an average light level per metadata subdivision, and a light level variance per metadata subdivision.

For example, the subdivision engine 514 generates tile-wise metadata for a subject tile by averaging the pixel-wise metadata associated with the subject tile. As another example, the subdivision engine 514 generates tile-wise metadata for a subject tile by averaging the pixel-wise metadata associated with the subject tile and its neighboring tiles. As yet another example, the subdivision engine 514 generates tile-wise metadata for a subject tile by averaging the pixel-wise metadata associated with the subject tile and its neighboring tiles, where the pixel-wise metadata for the subject tile is assigned a first weight and the pixel-wise metadata for the neighboring tiles is assigned a second weight less than the first weight. One of ordinary skill in the art will appreciate that the subdivisions (e.g., the plurality of tiles) and subdivision specific metadata (e.g., the tile-wise metadata) may be generated and/or structured in myriad ways.

In some implementations, as represented by block 938, subdividing the metadata into a plurality of metadata subdivisions includes tessellating the metadata into a plurality of tiles. As one example, with reference to FIG. 7A, the tile-based tone mapping architecture 700 or a component thereof (e.g., the tessellator 704) divides the metadata 702 into a plurality of tiles as described above with reference to FIG. 6A. In some implementations, the tessellator 704 also generates tile-wise metadata 706 for the plurality of tiles based on the metadata 702 (e.g., the pixel-wise and/or frame-wise metadata). For example, the tessellator 704 generates tile-wise metadata 706 for a subject tile by averaging the pixel-wise metadata associated with the subject tile. As another example, the tessellator 704 generates tile-wise metadata 706 for a subject tile by averaging the pixel-wise metadata associated with the subject tile and its neighboring tiles. As yet another example, the tessellator 704 generates tile-wise metadata 706 for a subject tile by averaging the pixel-wise metadata associated with the subject tile and its neighboring tiles, where the pixel-wise metadata for the subject tile is assigned a first weight and the pixel-wise metadata for the neighboring tiles is assigned a second weight less than the first weight.

As represented by block 940, the method 930 includes generating encoded information based on the input image and the plurality of metadata subdivisions. For example, with reference to FIG. 5, the image processing architecture 500 or a component thereof (e.g., the optional metadata encoder 516A) encodes the subdivision-wise metadata 515 into the source content 502 to generate an output encoded image stream.

As represented by block 942, the method 930 includes transmitting the encoded information to the electronic device via the communication interface. For example, with reference to FIG. 5, the image processing architecture 500 or a component thereof transmits the output encoded image stream across a channel to the optional metadata decoder 516B (e.g., associated with the electronic device 120).

FIG. 9C illustrates a flowchart representation of another method 950 of generating metadata estimations based on metadata subdivisions in accordance with some implementations. In various implementations, the method 950 is performed at an electronic device (e.g., the electronic device 120 in FIGS. 1 and 3, or the like) including one or more processors, non-transitory memory, a communication interface, a display device, an input capture device, and optionally one or more input devices, wherein the electronic device is communicatively coupled to a controller (e.g., the controller 110 in FIGS. 1 and 2, or the like) via the communication interface. In some implementations, the method 950 is performed by processing logic, including hardware, firmware, software, or a combination thereof. In some implementations, the method 950 is performed by a processor executing code stored in a non-transitory computer-readable medium (e.g., a memory). In some implementations, the electronic device corresponds to a tablet, a mobile phone, a laptop, a near-eye system, a head-mounted device, a head-mounted enclosure, a head-mounted system, a wearable computing device, or the like.

In some implementations, the method 950 includes: obtaining an input image; and transmitting the input image to the controller via the communication interface. In some implementations, the input image corresponds to an image frame, an image stream, a portion of video content, one or more keyframes, or the like. As one example, the electronic device obtains the input image from a library of pre-existing content stored by a local source or a remote source. As another example, the electronic device obtains the input image by capturing the input image via the image capture device.

As represented by block 952, the method 950 includes obtaining a plurality of metadata subdivisions associated with an input image from controller via the communication interface. In some implementations, the method 950 includes: obtaining encoded information associated with the input image and the plurality of metadata subdivisions from the controller via the communication interface; and obtaining the plurality of metadata subdivisions by decoding the encoded information. For example, with reference to FIG. 5, the image processing architecture 500 or a component thereof (e.g., the metadata decoder 516B) obtains the output encoded image stream (e.g., from the controller 110) and decodes the output encoded image stream to recover the subdivision-wise metadata 515 and the source content 502 (e.g., the input image or a derivative thereof).

As represented by block 954, the method 950 includes determining a viewport relative to the input image based on at least one of head pose information and eye tracking information. input image based on at least one of head pose information and eye tracking information. As one example, with reference to FIG. 5, the image processing architecture 500 or a component thereof (e.g., the viewport calculator 520) determines a viewport 521 of the user relative to the source content 502 based at least in part on the eye tracking vector 413 and/or the pose characterization vector 415 described above with reference to FIG. 4. In some implementations, the viewport 521 corresponds to a current FOV of the user relative to the source content 502. In some implementations, the viewport 521 corresponds to a viewing frustum of the user relative to the source content 502.

As another example, with reference to FIG. 7A, the tile-based tone mapping architecture 700 or a component thereof (e.g., the viewport calculator 520) determines a viewport 521 of the user relative to the input image 701A based at least in part on the eye tracking vector 413 or the pose characterization vector 415 described above with reference to FIG. 4. In some implementations, the viewport 521 corresponds to a current FOV of the user relative to the input image 701A. In some implementations, the viewport 521 corresponds to a viewing frustum of the user relative to the input image 701A.

In some implementations, the method 950 includes obtaining, via the one or more input devices, the head pose information and the eye tracking information. According to some implementations, the one or more input devices correspond to a head/body pose tracking engine, an eye tracking engine, motions sensors (e.g., an IMU, an accelerometer, a gyroscope, a magnetometer, and/or the like), or the like. As one example, with reference to FIG. 4, the computing device or a portion thereof (e.g., the head/body pose tracking engine 414) obtains (e.g., receives, retrieves, or determines/generates) a pose characterization vector 415 and updates the pose characterization vector 415 over time in response to detecting changes to the head/body pose of the user 150. In some implementations, obtaining the pose characterization vector 415 corresponds to generating the pose characterization vector 415 based on sensor data collected by the computing system. In some implementations, the sensor data is collected by a combination of optional remote sensors, the electronic device 120, and the controller 110. As shown in FIG. 4, for example, the input processing architecture 400 generates the pose characterization vector 415 based on the local sensor data 403 and/or the remote sensor data 405.

As represented by block 956, the method 950 includes generating one or more metadata estimations by performing an estimation algorithm on at least a portion of the plurality of metadata subdivisions associated with the viewport. In some implementations, the estimation algorithm corresponds to one of a bilinear interpolation algorithm and an area-based weighted sum algorithm. As one example, with reference to FIG. 5, the image processing architecture 500 or a component thereof (e.g., the metadata estimator 518) generates a metadata estimation by performing an estimation algorithm on the subdivision-wise metadata 515 based on the viewport 521. For example, the estimation algorithm corresponds to one of the bilinear interpolation algorithm 712 described below with reference to FIG. 8B, the area-based weighted sum algorithm 714 described below with reference to FIG. 8C, or the like. One of ordinary skill in the art will appreciate that the metadata estimator 518 may employ various spatiotemporal estimation algorithms or techniques.

As another example, with reference to FIG. 7A, the tile-based tone mapping architecture 700 or a component thereof (e.g., the metadata estimator 518) generates one or more metadata estimations 715 by performing an estimation algorithm on the tile-wise metadata 706 based on the viewport 521. For example, the estimation algorithm corresponds to one of the bilinear interpolation algorithm 712 described below with reference to FIG. 8B, the area-based weighted sum algorithm 714 described below with reference to FIG. 8C, or the like.

In some implementations, as represented by block 958, the method 950 includes selecting the portion of the plurality of metadata subdivisions based on the viewport. In some implementations, the portion of the plurality of metadata subdivisions corresponds to a subset of tiles from among the plurality of tiles that at least partially overlap the viewport. As one example, with reference to FIG. 8A, the computing system or a component thereof (e.g., the metadata estimator 518 in FIGS. 5 and 7A) selects tiles 810 from among the plurality of tiles of the image frame 800 based on the viewing frustum 806 for the metadata estimation algorithm.

According to some implementations, as represented by block 958A, the portion of the plurality of metadata subdivisions corresponds to a subset of tiles from among the plurality of tiles that at least partially overlap the viewport. As one example, with reference to FIG. 8A, the computing system or a component thereof (e.g., the metadata estimator 518 in FIGS. 5 and 7A) selects tiles 810 from among the plurality of tiles of the image frame 800 based on the viewing frustum 806 for the metadata estimation algorithm.

According to some implementations, as represented by block 958B, the portion of the plurality of metadata subdivisions corresponds to a subset of tiles from among the plurality of tiles that at least partially overlap a bounding box surrounding the viewport. As one example, with reference to FIG. 8C, the computing system or a component thereof (e.g., the metadata estimator 518 in FIGS. 5 and 7A) selects tiles 810 (sometimes referred to herein as the selected tile set {T}) from among the plurality of tiles of the image frame 800 based on the bounding box for the metadata estimation algorithm.

As represented by block 960, the method 950 includes generating an output image by performing an image processing algorithm on the input image based on the one or more metadata estimations. As one example, with reference to FIG. 5, the image processing architecture 500 or a component thereof (e.g., the downstream application/algorithm 530) performs an application, algorithm, function, process, etc. on the source content 502 based on the metadata estimation from the metadata estimator 518. For example, the downstream application/algorithm 530 corresponds to a tone mapping algorithm, a night mode function, a true tone algorithm, a high dynamic range (HDR) algorithm, and/or the like.

According to some implementations, the image processing algorithm corresponds to a tone mapping algorithm, and each of the plurality of metadata subdivisions includes at least one of a minimum light level per metadata subdivision, a maximum light level per metadata subdivision, an average light level per metadata subdivision, and a light level variance per metadata subdivision In some implementations, as represented by block 962, the method 950 includes presenting the output image via the display device. For example, the electronic device 120 or a component thereof (e.g., the presenter 346 in FIG. 3) presents the output image via the one or more displays 312.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including one or more processors, non-transitory memory, and a communication interface, wherein the computing system is communicatively coupled to a display device and an image capture device via the communication interface:
  obtaining an input image;
  obtaining metadata associated with the input image;
  subdividing the metadata into a plurality of metadata subdivisions;
  determining a viewport relative to the input image based on at least one of head pose information and eye tracking information;
  generating one or more metadata estimations by performing an estimation algorithm on at least a portion of the plurality of metadata subdivisions associated with the viewport; and
  generating an output image by performing an image processing algorithm on the input image based on the one or more metadata estimations.

2. The method of claim 1, wherein subdividing the metadata into the plurality of metadata subdivisions includes tessellating the metadata into a plurality of tiles.

3. The method of claim 2, wherein the portion of the plurality of metadata subdivisions corresponds to a subset of tiles from among the plurality of tiles that at least partially overlap the viewport.

4. The method of claim 2, wherein the portion of the plurality of metadata subdivisions corresponds to a subset of tiles from among the plurality of tiles that at least partially overlap a bounding box surrounding the viewport.

5. The method of claim 1, wherein the estimation algorithm corresponds to one of a bilinear interpolation algorithm and an area-based weighted sum algorithm.

6. The method of claim 1, wherein the image processing algorithm corresponds to one of a tone mapping algorithm, a high dynamic range algorithm, a true tone algorithm, and a night mode function.

7. The method of claim 1, wherein obtaining the metadata associated with the input image includes obtaining the metadata associated with the input image based on at least one of one or more inputs to the image processing algorithm or one or more outputs from the image processing algorithm.

8. The method of claim 7, wherein the image processing algorithm corresponds to a tone mapping algorithm, and
wherein each of the plurality of metadata subdivisions includes at least one of a minimum light level per metadata subdivision, a maximum light level per metadata subdivision, an average light level per metadata subdivision, and a light level variance per metadata subdivision.

9. The method of claim 1, further comprising:
presenting, via the display device, the output image.

10. The method of claim 1, further comprising:
obtaining, via one or more input devices, the head pose information and the eye tracking information.

11. The method of claim 1, wherein obtaining the input image includes capturing the input image via the image capture device.

12. The method of claim 1, wherein the input image corresponds to a portion of video content or an image stream.

13. The method of claim 1, wherein the input image corresponds to one of pre-existing content obtained from a local source or a remote source or content captured by the image capture device.

14. A computing system comprising:
one or more processors;
a non-transitory memory;
a communication interface for communicating with a display device and an image capture device; and
one or more programs stored in the non-transitory memory, which, when executed by the one or more processors, cause the computing system to:
obtain an input image;
obtain metadata associated with the input image;
subdivide the metadata into a plurality of metadata subdivisions;
determine a viewport relative to the input image based on at least one of head pose information and eye tracking information;
generate one or more metadata estimations by performing an estimation algorithm on at least a portion of the plurality of metadata subdivisions associated with the viewport; and
generate an output image by performing an image processing algorithm on the input image based on the one or more metadata estimations.

15. The computing system of claim 14, wherein subdividing the metadata into the plurality of metadata subdivisions includes tessellating the metadata into a plurality of tiles.

16. The computing system of claim 15, wherein the portion of the plurality of metadata subdivisions corresponds to a subset of tiles from among the plurality of tiles that at least partially overlap the viewport.

17. The computing system of claim 15, wherein the portion of the plurality of metadata subdivisions corresponds to a subset of tiles from among the plurality of tiles that at least partially overlap a bounding box surrounding the viewport.

18. The computing system of claim 14, wherein obtaining the metadata associated with the input image includes obtaining the metadata associated with the input image based on at least one of one or more inputs to the image processing algorithm or one or more outputs from the image processing algorithm.

19. A non-transitory memory storing one or more programs, which, when executed by one or more processors of a computing system with a communication interface for communicating with a display device and an image capture device, cause the computing system to:
obtain an input image;
obtain metadata associated with the input image;
subdivide the metadata into a plurality of metadata subdivisions;
determine a viewport relative to the input image based on at least one of head pose information and eye tracking information;
generate one or more metadata estimations by performing an estimation algorithm on at least a portion of the plurality of metadata subdivisions associated with the viewport; and
generate an output image by performing an image processing algorithm on the input image based on the one or more metadata estimations.

20. The non-transitory memory of claim 19, wherein subdividing the metadata into the plurality of metadata subdivisions includes tessellating the metadata into a plurality of tiles.

21. The non-transitory memory of claim 20, wherein the portion of the plurality of metadata subdivisions corresponds to a subset of tiles from among the plurality of tiles that at least partially overlap the viewport.

22. The non-transitory memory of claim 20, wherein the portion of the plurality of metadata subdivisions corresponds to a subset of tiles from among the plurality of tiles that at least partially overlap a bounding box surrounding the viewport.

23. The non-transitory memory of claim 19, wherein obtaining the metadata associated with the input image includes obtaining the metadata associated with the input image based on at least one of one or more inputs to the image processing algorithm or one or more outputs from the image processing algorithm.

* * * * *